US012297741B2

(12) United States Patent
Kim

(10) Patent No.: US 12,297,741 B2
(45) Date of Patent: May 13, 2025

(54) RAPID ACTIVE CLEARANCE CONTROL SYSTEM OF INTER STAGE AND MID-SEALS

(71) Applicant: General Electric Company, Schenectady, NY (US)

(72) Inventor: Taehong Kim, Evendale, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/337,321

(22) Filed: Jun. 19, 2023

(65) Prior Publication Data

US 2024/0418098 A1 Dec. 19, 2024

(51) Int. Cl.
*F01D 11/24* (2006.01)

(52) U.S. Cl.
CPC ........ *F01D 11/24* (2013.01); *F05D 2220/323* (2013.01); *F05D 2270/301* (2013.01); *F05D 2270/303* (2013.01); *F05D 2270/304* (2013.01); *F05D 2270/44* (2013.01)

(58) Field of Classification Search
CPC .......... F01D 11/00; F01D 11/08; F01D 11/14; F01D 11/20; F01D 11/22; F05D 2270/301; F05D 2270/404; F05D 2270/405; F05D 2270/44; F05D 2270/3015; F05D 2270/62; F05D 2270/708; F05D 2220/323
See application file for complete search history.

(56) References Cited

U.S. PATENT DOCUMENTS 5,104,287 A * 4/1992 Ciokajlo ................ F01D 11/22 415/173.2
6,715,984 B2 * 4/2004 Nakajima ............. F04D 27/001 415/118
7,086,649 B2 8/2006 Plona
7,367,776 B2 5/2008 Albers et al.
7,946,808 B2 5/2011 Taylor et al.
(Continued)

FOREIGN PATENT DOCUMENTS

EP 1686243 B1 9/2016

OTHER PUBLICATIONS https://priorart.ip.com/IPCOM/000257950, Mechanically Actuated Active Clearance Control With Dual Adjustments, accessed Jun. 2, 2023, 2 pages.

*Primary Examiner* — Courtney D Heinle
*Assistant Examiner* — Ryan C Clark
(74) *Attorney, Agent, or Firm* — Hanley, Flight & Zimmerman, LLC

(57) ABSTRACT

Example apparatus, systems, and methods for rapid active clearance control of inter-stage and mid-stage seals are disclosed. An example apparatus to control clearance for a turbine engine comprises a case surrounding at least part of the turbine engine and defining an opening therethrough; a nozzle, the nozzle including a reference pressure sensor and a static pressure sensor on a tip of the nozzle; an actuator including a multilayer stack of material, a rod coupled to the first actuator and coupled to the nozzle through the opening in the case, the rod to move the nozzle based on contraction or expansion of the multilayer stack of material; and a controller to calculate and set the clearance between the rotor and the nozzle by supplying an electrical current to the multilayer stack to cause the multilayer stack to at least one of expand or contract.

18 Claims, 23 Drawing Sheets

(56) References Cited

U.S. PATENT DOCUMENTS

| | | | | | |
|---|---|---|---|---|---|
| 8,052,380 | B2 | 11/2011 | Willett, Jr. | | |
| 8,126,628 | B2 * | 2/2012 | Hershey | F01D 11/24 | 415/173.1 |
| 8,240,986 | B1 * | 8/2012 | Ebert | F01D 11/001 | 415/230 |
| 8,534,996 | B1 * | 9/2013 | Pankey | F01D 11/22 | 415/173.2 |
| 9,169,741 | B2 | 10/2015 | Szwedowicz et al. | | |
| 9,255,489 | B2 | 2/2016 | DiTomasso et al. | | |
| 9,587,511 | B2 * | 3/2017 | Willett, Jr. | G01B 7/14 | |
| 10,364,694 | B2 * | 7/2019 | Ribarov | F01D 25/24 | |
| 11,293,297 | B2 * | 4/2022 | Korepin | F01D 25/246 | |
| 11,454,131 | B2 | 9/2022 | Kim et al. | | |
| 2008/0206039 | A1 * | 8/2008 | Kane | F01D 11/20 | 415/1 |
| 2013/0034423 | A1 | 2/2013 | Adaickalasamy et al. | | |
| 2017/0175645 | A1 * | 6/2017 | Devarakonda | F02C 9/28 | |
| 2017/0300018 | A1 * | 10/2017 | Block | G05B 19/4065 | |
| 2020/0191162 | A1 | 6/2020 | Weihard et al. | | |
| 2022/0178266 | A1 * | 6/2022 | Kim | F01D 25/24 | |
| 2023/0028412 | A1 | 1/2023 | Kim et al. | | |

* cited by examiner

RAPID ACTIVE CLEARANCE CONTROL SYSTEM OF INTER STAGE AND MID-SEALS

FIELD OF THE DISCLOSURE

This disclosure relates generally to a gas turbine engine, and, more particularly, to rapid active clearance control systems of inter stage and mid-seals of a gas turbine engine.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In general, it is desirable for a gas turbine engine to maintain clearance between the tip of a blade in the gas turbine engine and the stationary parts of the gas turbine engine (e.g., the gas turbine engine casing, stator, etc.). During operation, the gas turbine engine is exposed to thermal (e.g., hot and cold air pumped into the gas turbine engine, etc.) and mechanical loads (e.g., centrifugal force on the blades on the gas turbine engine, etc.), which can expand and contract the gas turbine engine casing and rotor. The expansion and contraction of the gas turbine engine casing can control the clearance between the blade tip and the stationary parts of the gas turbine engine. There is a continuing need to control the clearance between the blade tip and the engine casing that fluctuates during normal operation for a gas turbine engine to avoid damage to the gas turbine engine (e.g., wear, breakage, etc. due to unintentional rub) and control the clearances for better engine performance and operation.

Figure 1:
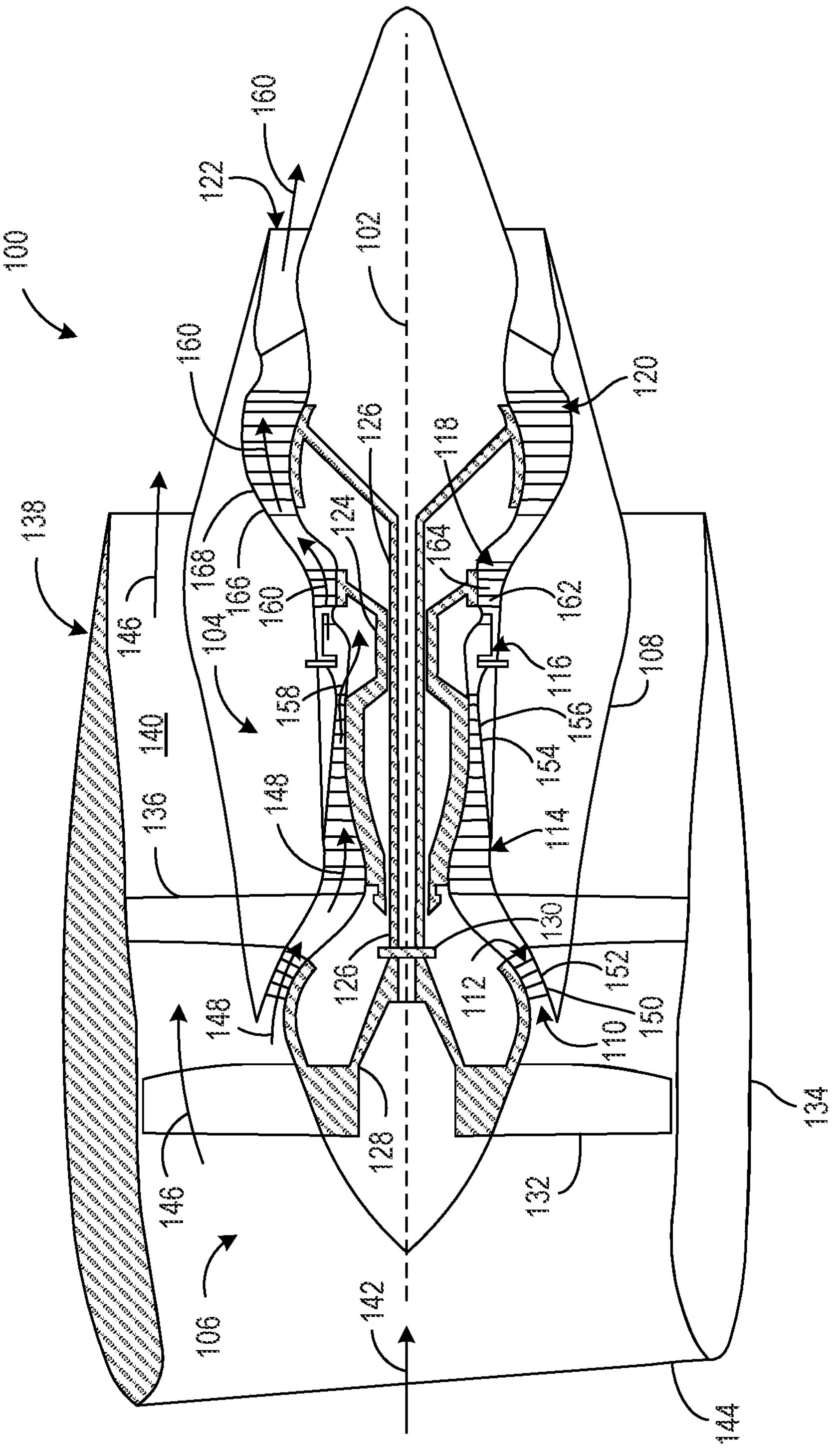
FIG. 1 is a schematic cross-sectional view of an example gas turbine engine in accordance with the examples disclosed herein.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is, therefore, provided to describe example implementations and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, "vertical" refers to the direction perpendicular to the ground. As used herein, "horizontal" refers to the direction parallel to the centerline of the gas turbine engine 100. As used herein, "lateral" refers to the direction perpendicular to the axial and vertical directions (e.g., into and out of the plane of FIGS. 1, 2, etc.).

In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.).

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor, or a booster compressor located between the fan and a high-pressure compressor. A turbine engine also includes a turbine with an intricate array of alternating rotating and stationary airfoil-section blades. As the hot combustion gas passes through the turbine, the hot combustion gas expands, causing the rotating blades to spin.

The components of the turbine engine (e.g., the fan, the booster compressor, the high-pressure compressor, the high-pressure turbine, the low-pressure turbine, etc.) can degrade over time due to demanding operating conditions such as extreme temperature and vibration. During operation, the turbine engine components are exposed to thermal (e.g., hot and cold air pumped into the turbine engine, etc.) and mechanical loads (e.g., centrifugal force on the blades on the turbine engine, etc.), which can expand and contract the turbine engine casing and/or compressor casing within the turbine engine along with other components of the turbine engine and/or its compressor. The expansion and contraction of the turbine engine casing and/or compressor casing within the turbine engine can change the clearance between the blades' tips and the stationary components of the turbine engine. In some examples, if the clearance between the blades' tips and the stationary components is not controlled, then the blades' tips and stationary components can collide during operation and lead to further degradation of the components of the turbine engine.

An Active Clearance Control (ACC) System was developed to improve engine performance by managing the clearance between a gas turbine containment structure and a tip of a rotating blade without unexpected harmful rub events during flight and ground operations. A conventional ACC System includes using cooling air from a fan or compressor to control the clearance between the blade tip and an engine component that has shrunk (e.g., the stator, the case, etc.). The conventional ACC system is limited in that clearance is only modulated in one direction (e.g., engine component shrinkage). For a hot rotor condition (e.g., the engine component(s) are expanded), the conventional ACC system waits for rotor-stator thermal/mechanical growth matching to escape the hot rotor condition (e.g., modulate the blade tip clearance). Tip clearance is maintained at a minimum value to ensure maximum propulsive efficiency. For example, combusted gas temperatures can exceed 1,000 degrees Celsius, causing turbine blade expansion as well as expansion of the containment structure, increasing tip clearance and reducing overall turbine efficiency (e.g., increased fuel burn and fuel consumption). Control of thermal expansion and contraction of the containment structure permits turbine tip clearance control.

Conventional ACC systems have an inability to directly control a stator nozzle (also referred to as a vane) and a connected compressor inter-stage seal. The compressor inter-stage seal is passively dependent on the ACC. The ACC is not connected to the compressor, meaning that the nozzle conventionally hangs connected between two hangers, with a mid-stage seal, that are connected to the case. The hangers have shrouds attached that are affected by temperature and pressures from the blades, which may sometimes cause uneven displacement between the forward and aft sides. This uneven displacement results in nozzle rocking, causing pressure loss at both the inter-stage seal and the mid-stage seal.

The inter-stage seal clearance can create problems regarding pressure balancing on forward and aft sides. If the clearance is too open, temperature has a tendency to build up on the forward side by the blade, resulting in airflow and pressure loss to the aft side. The change in pressures alters the displacement of the hanger and shroud, resulting in nozzle rocking and further pressure loss.

In the instance of temperature build-up, the heat can cause thermal expansion radially inwardly of the case and connected components. The inter-stage seal clearance closes as a result of the expansion. With current, conventional ACC systems, there is a time delay to open the inter-stage seal clearance because the ACC only has the ability to control motion inward, towards the blades.

Examples disclosed herein improve an ACC system using actuator(s) with a multilayer stack of piezoelectric material (also referred to herein as a multilayer stack, piezoelectric material or piezoelectric stack) that provide rapid active clearance control of the inter stage and mid-seals without the mechanical delay seen in the conventional ACC system. Examples disclosed herein maintain desired clearances between the inter-stage seal and rotor without additional margin for various operating conditions, which leads to performance improvement and provide better exhaust gas temperature (EGT) control capability. In certain examples, the multilayer stack generates linear displacement when an electric current is applied. The linear displacement can have a force, and examples disclosed herein apply the linear force of the multilayer stack (made of piezoelectric material) for the ACC system to achieve rapid active clearance control of the inter stage and mid-seals. Examples disclosed herein apply the mechanical force from the linear displacement of the multilayer stack on to modulating the ACC system. Examples disclosed herein can include other materials that generate linear displacement such as, shape memory alloy (SMA), etc. The range of displacement is increased by adding layers of piezoelectric material or SMA, where more layers in a stack provides more radial movement range and gives the ACC system more muscle capability.

Examples disclosed herein use an actuator to house the multilayer stack. The actuator achieves clearance in two directions (e.g., radially inward and outward). Examples disclosed herein do not need additional clearance margin for maximum transient closure or hot-rotor condition like the conventional ACC system. Examples disclosed herein provide significant specific fuel consumption (SFC) improvement on tighter clearance and a better EGT control as there are no additional margins for transient closure or the hot rotor condition.

An example actuator design is a direct linear square actuator that is a tube in a piston style. The example actuator can be amplified if more muscle is necessary. The range and requirements depend from module to module, however, the force associated with the example actuator is in the range of about 450 to about 700 pounds-force. The example stroke/muscle is in the range of about 5 to about 14 mils. The example operating temperature range is about 120 to about 250 degrees Fahrenheit. The example actuator modulates a 1-mil derivative with a response time of approximately one millisecond. In an alternate design, the actuator is circular/disc shaped.

In the examples disclosed herein, using the actuator in conjunction with the multilayer stack can provide the flexibility to implement many different casing designs with compact and simple piezo stacks while providing the same high mechanical force as a conventional ACC.

Certain examples provide an engine controller, referred to as a full authority digital engine (or electronics) control (FADEC). The FADEC includes a digital computer, referred to as an electronic engine controller (EEC) or engine control unit (ECU), and related accessories that control aspects of aircraft engine performance. The FADEC can be used with a variety of engines such as piston engines, jet engines, other aircraft engines, etc. In certain examples, the EEC/ECU is provided separate from the FADEC, allowing manual override or intervention by a pilot and/or other operator.

In examples disclosed herein, the engine controller receives values for a plurality of input variables relating to flight condition (e.g., air density, throttle lever position, engine temperatures, engine pressures, etc.). The engine controller computes engine operating parameters such as fuel flow, stator nozzle position, air bleed valve position, etc., using the flight condition data. The engine operating parameters can be used by the engine controller to control operation of the multilayer stack to modulate blade tip and seal clearances in the turbine engine.

Reference now will be made in detail to embodiments of the presently disclosed technology, one or more examples of which are illustrated in the drawings. Each example is provided by way of explanation of the presently disclosed technology, not limitation of the presently disclosed technology. In fact, it will be apparent to those skilled in the art that various modifications and variations can be made in the presently disclosed technology without departing from the scope or spirit of the presently disclosed technology. For instance, features illustrated or described as part of one embodiment can be used with another embodiment to yield a still further embodiment. Thus, it is intended that the presently disclosed technology covers such modifications and variations as come within the scope of the appended claims and their equivalents.

FIG. 1 is a schematic cross-sectional view of a conventional turbofan-type gas turbine engine 100. As shown in FIG. 1, the gas turbine engine 100 defines a longitudinal or axial centerline axis 102 extending therethrough for reference. In general, the gas turbine engine 100 may include a core turbine 104 disposed downstream from a fan section 106.

The core turbine 104 generally includes a substantially tubular outer casing 108 that defines an annular inlet 110. The outer casing 108 can be formed from a single casing or multiple casings. The outer casing 108 encloses, in serial flow relationship, a compressor section having a booster or low pressure compressor ("LP compressor 112") and a high pressure compressor ("HP compressor 114"), a combustion section 116, a turbine section having a high pressure turbine ("HP turbine 118") and a low pressure turbine ("LP turbine 120"), and an exhaust section 122. A high pressure shaft or spool ("HP shaft 124") drivingly couples the HP turbine 118 and the HP compressor 114. A low pressure shaft or spool ("LP shaft 126") drivingly couples the LP turbine 120 and the LP compressor 112. The LP shaft 126 may also couple to a fan spool or shaft ("fan shaft 128") of the fan section 106. In some examples, the LP shaft 126 may couple directly to the fan shaft 128 (e.g., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the gas turbine engine 100 during operation thereof. A first portion 146 of the air 142 flows into the bypass airflow passage 140, while a second portion 148 of the air 142 flows into the inlet 110 of the LP compressor 112. One or more sequential stages of LP compressor stator nozzles 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator nozzles 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator nozzles 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator nozzles 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the gas turbine engine 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106.

Figure 2:
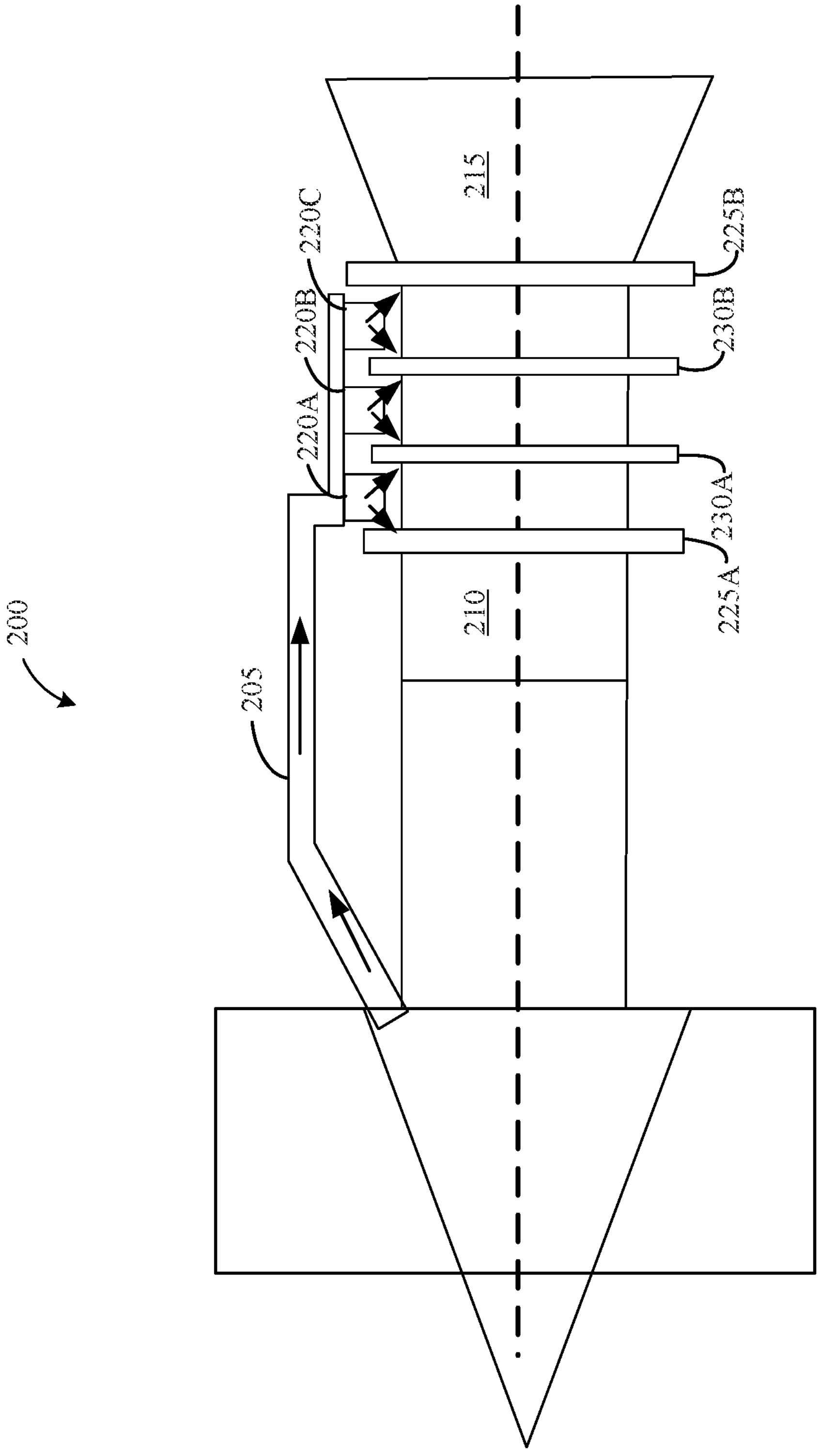
FIG. 2 is a schematic cross-sectional view of an example gas turbine engine with a conventional active clearance control (ACC) system.

FIG. 2 is a schematic cross-sectional view of an example gas turbine engine with a conventional active clearance control (ACC) system 200. The ACC system 200 includes an example main pipe 205, an example high pressure turbine 210, an example low pressure turbine 215, example manifolds 220A, 220B, 220C, example flanges 225A, 225B, and example mid-rings 230A, 230B. In the illustrated example of FIG. 2, air from a fan (e.g., from the fan section 106) enters the main pipe 205, where the airflow in the main pipe 205 is shown by the arrows in FIG. 2. In some examples, the inlet of the main pipe 205 is located at the fan (e.g., the fan section 106 of FIG. 1) or upstream of a compressor (e.g., the HP compressor 114 of FIG. 1) for the high pressure turbine 210. In some examples, the ACC system 200 is applicable for a compressor (e.g., the HP compressor 114 and LP compressor 112 of FIG. 1) and the low pressure turbine 215. The main pipe 205 delivers the air from the fan to the manifolds 220A, 220B, 220C. The manifolds 220A, 220B, 220C evenly distribute the air from the fan to the high pressure turbine 210 and the low pressure turbine 215. In some examples, the high pressure turbine 210 is substantially similar to the HP turbine 118, and the low pressure turbine 215 is substantially similar to the LP turbine 120. The flanges 225A, 225B and mid-rings 230A, 230B are joined to the outer surfaces of the high pressure turbine 210 case and the low pressure turbine 215 case. The flanges 225A, 225B and mid-rings 230A, 230B are configured to contract radially inward and/or expand radially outward in responses to changes in temperature (e.g., changes in temperature caused by the air from the manifolds 220A, 220B, 220C). In some examples, at least some of the air is directed to impinge on the surfaces of the flanges 225A, 225B and mid-rings 230A, 230B. In some examples, the contraction inward and expansion outward of the flanges 225A, 225B and the mid-rings 230A, 230B can change blade tip clearances in the high pressure turbine 210 and the low pressure turbine 215.

In the following examples, EGT refers to a temperature of turbine exhaust gases during exit from the turbine unit, the temperature measured using thermocouples mounted in the exhaust stream. Active clearance control maintains optimal or otherwise improved clearance in part to help ensure that EGT remains below its limit (e.g., a temperature threshold), which improves engine efficiency and time-on-wing. Likewise, tighter blade tip clearances are maintained to reduce air leakage over blade 164, 168 tips, otherwise rotor inlet temperatures are increased to achieve the same level of performance and hot section components experience a reduced life cycle due to the temperature increases (e.g., thermal fatigue) to produce the same amount of work. Furthermore, maintenance costs can be reduced by ensuring engine efficiency through optimized tip clearances via ACC.

Figure 3:
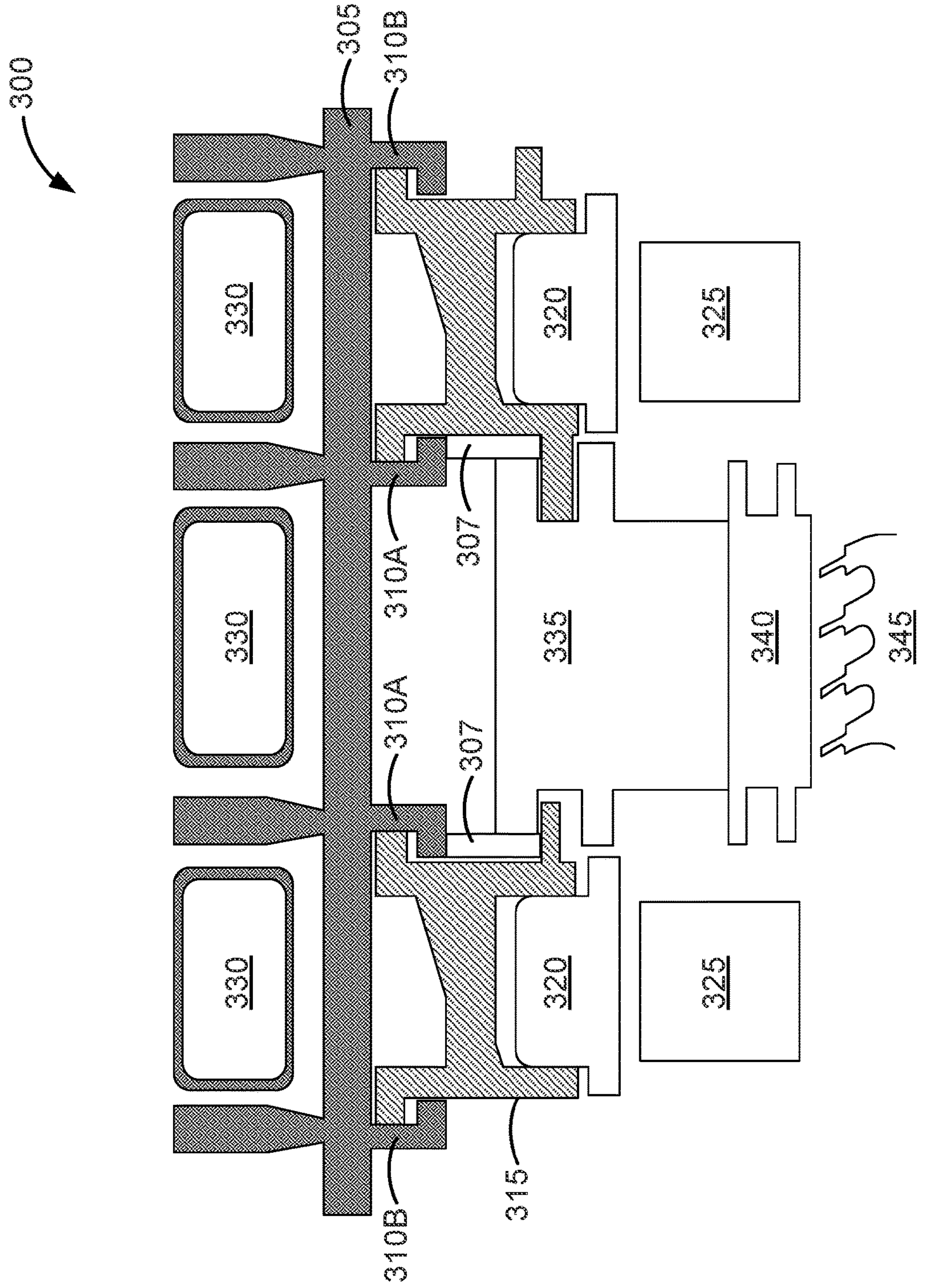
FIG. 3 (PRIOR ART)
FIG. 3 is a schematic cross-sectional view of an ACC system for a high pressure turbine engine.

FIG. 3 is a schematic cross-sectional view of a prior ACC system 300 for an example high pressure turbine, such as the gas turbine engine 100 of FIG. 1. The prior ACC system 300 includes a case 305, guiding hooks 310A, 310B, a hanger 315, a shroud 320, a blade 325, mid stage seals 307, a stator nozzle 335, and an inter-stage seal 340. In the illustrated example of FIG. 3, the case 305 is the casing surrounding either the HP turbine 118, the LP turbine 120, and/or the compressor (e.g., the HP compressor 114 and LP compressor 112 of FIG. 1). The case 305 includes the guiding hooks 310A, 310B, and the guiding hooks 310A, 310B connect the case 305 to the hanger 315. The hanger 315 is connected to the shroud 320. The stator nozzle 335 is also connected to the hangers 315 with an inter-stage seal 340. Mid stage seals 307 balance pressures of the stator nozzles 335 of a forward and an aft cavity.

In the illustrated example of FIG. 3, the prior ACC system 300 determines the clearance between the shroud 320 and the blade 325, as well as the inter-stage seal 340 and the rotor 345. The prior ACC system 300 uses the ACC 330 to control the movement of the shroud 320 and stator nozzle 335 in only one direction (e.g., inward towards the blade 325). The prior ACC system 300 uses cooling airflow from the compressor or fan (shown in FIG. 2) to cool the case 305. The case 305 shrinks (e.g., moves inward) as it is cooled by the airflow. The case 305 moves the hanger 315, shroud 320, and stator nozzle 335 inward towards the blade 325. The prior ACC system 300 is unable to move the case 305, the hanger 315, the shroud 320, and the stator nozzle 335 for expansion. For example, the ACC system 300 is unable to expand the case 305 (e.g., move outward) to increase the clearance between the shroud 320 and the blade 325 or between the inter-stage seal 340 and the rotor 345. In such examples, the prior ACC system 300 waits for clearance between the shroud 320 and the blade 325 or between the inter-stage seal 340 and the rotor 345 to open (e.g., increase). The prior ACC system 300 does not provide bi-directional control of the clearance between the shroud 320 and the blade 325 or subsequently between the inter-stage seal 340 and the rotor 345.

In some examples (e.g., the prior ACC system 300 of FIG. 3), an ACC system directs airflow around the case of an engine to control clearance between the case and the blade tip, as well as the inter-stage seal and the rotor. For example, the ACC system controls the cooling airflow (shown in FIG. 2) from a compressor or fan to the case 305. In some examples, the ACC system mixes hot and cold air from a compressor and a bypass duct (contains gas turbine engine airflow that bypassed the engine core) respectively to a desired temperature. In some examples, the ACC system helps to maintain and adjust the clearance between the inter-stage seal and the rotor in prior ACC systems. In prior ACC systems (e.g., the prior ACC system 300 of FIG. 3), cooling airflow around the engine case (e.g., case 305) adjusts the clearance by controlling the thermal expansion and contraction of the case. In some examples, the ACC 330 controls the cooling airflow to contract the turbine engine case. For example, the prior ACC system 300 directs cooling airflow to the case 305 to contract the case 305 and restricts the cooling airflow to the case 305 to expand the case 305. The ACC system 300 controls the cooling airflow to adjust the clearance to compensate any changes in the blade of the turbine engine. In some examples, the ACC system 300 is controlled by a controller in the turbine engine (e.g., the FADEC). The FADEC sends electrical control signals to the ACC system 300 to signal the ACC system 300 to modulate the airflow to control the case thermal expansion. The ACC system 300 ultimately controls the amount of cooling airflow to manage the turbine engine casing temperatures, thereby adjusting the inter-stage seal clearance. The clearance control fails to be performed in real-time and is without finite control over the contraction or expansion of the case 305 or any components with displacements dependent therefrom.

Figure 4:
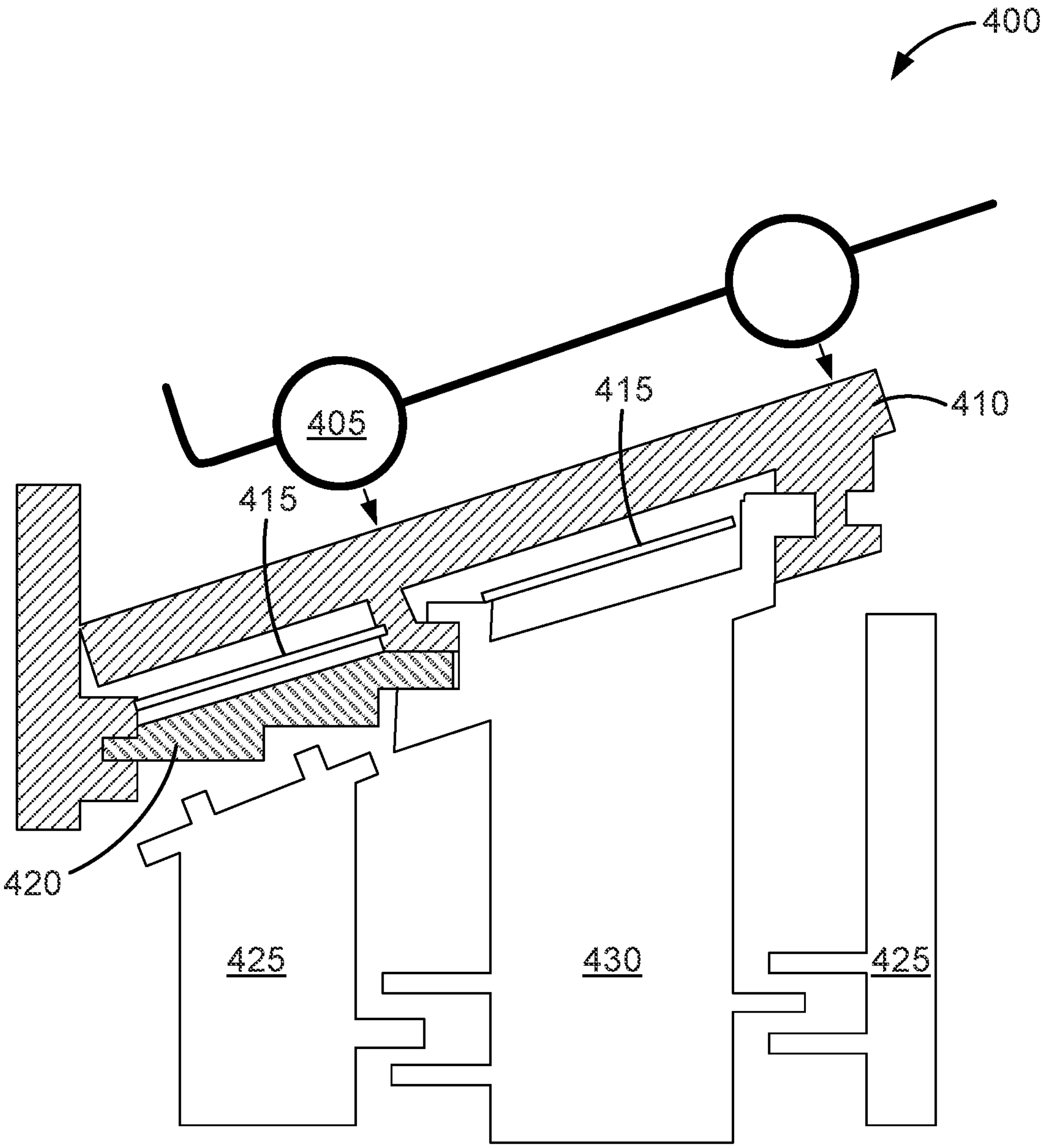
FIG. 4 (PRIOR ART)
FIG. 4 is a schematic cross-sectional view of an ACC system for a low pressure turbine engine.

FIG. 4 is a schematic cross-sectional view of an example ACC system 400 in a low pressure turbine (LPT) implementation. With this prior LPT ACC system 400, a case 410 is connected directly to a shroud 420 and a stator nozzle 430. Airfoils 425 are on either side of the stator nozzle 430. Heat shields 415 are in place to mitigate thermal expansion of the case when pressure builds up. Similar to the ACC system in FIG. 3, the ACC 405 directs airflow around the case 410 of an engine to control clearance between the case 410 and the blade tip, as well as the inter-stage seal and the rotor. For example, the ACC 405 controls the cooling airflow (shown in FIG. 2) from a compressor or fan to the case 410. The clearance control fails to be performed in real-time and is without finite control over the contraction or expansion of the case 410 or any components with displacements dependent therefrom.

Figure 5:
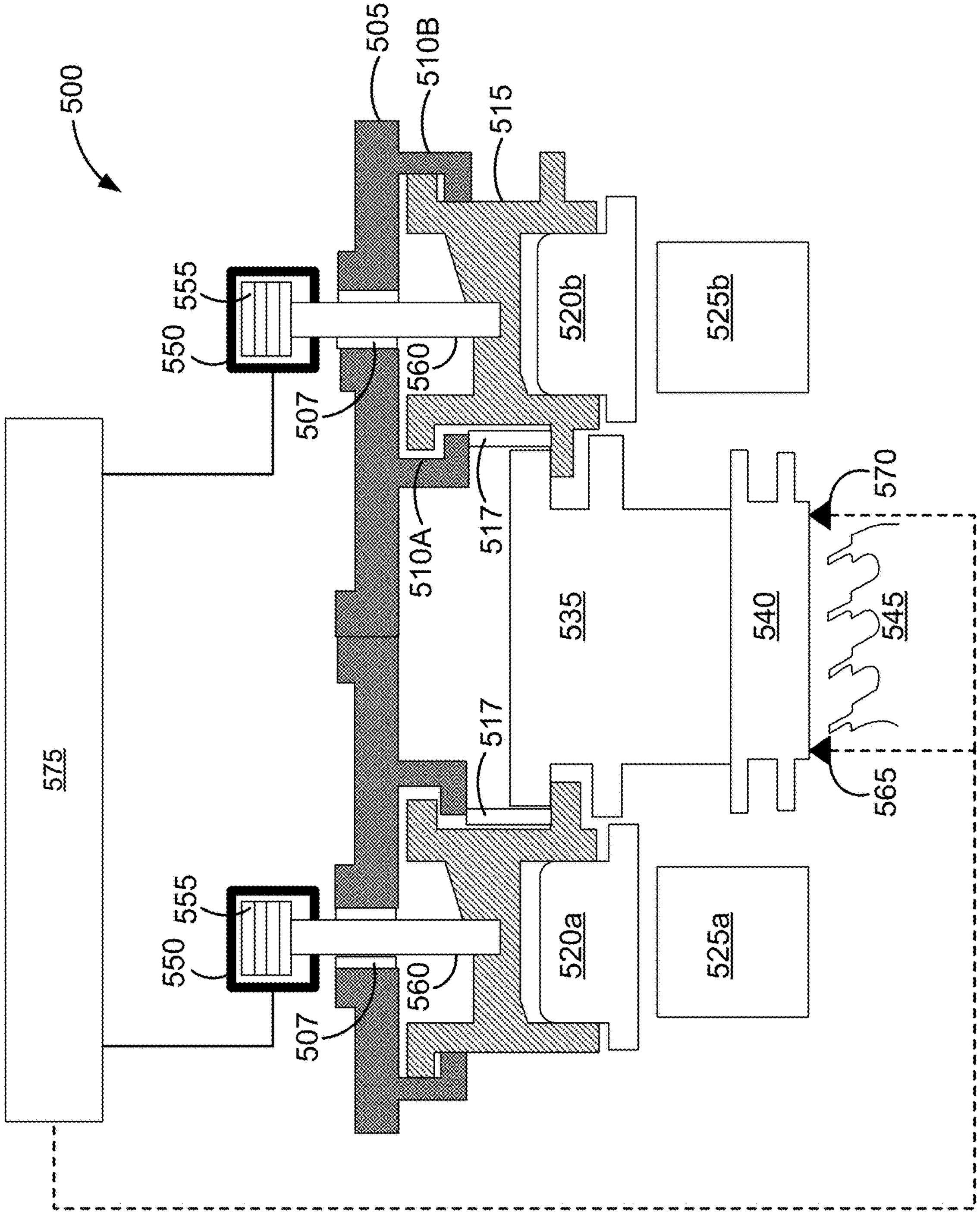
FIG. 5 is a schematic cross-sectional view of a second example ACC system for a high pressure turbine engine in accordance with teachings disclosed herein.

FIG. 5 is a schematic cross-sectional view of an example high pressure turbine ACC system 500 in accordance with teachings disclosed herein. The example ACC system 500 of FIG. 5 includes an actuator 550, a rod 560, a mid-stage seal 517, a case 505, guide hooks 510A, 510B, a hanger 515, a shroud 520, a blade 525, a stator nozzle 535, a placement seal 507 in the case 505 to allow for placement of the rod 560, and an inter-stage seal 540. The actuator 550 includes a multilayer stack 555, for example. In this example, forward pressure sensor 565 and aft pressure sensor 570 are attached to the inter-stage seal 540 to measure pressure and send the measurements to the active clearance controller 575. The active clearance controller 575 integrates the feedback from the forward and aft sensors 565, 570 with the actuator movement to enable finite control of the displacement of the stator nozzle 535 and inter-stage seal 540. The example ACC system 500 of FIG. 5 includes an open clearance between the inter-stage seal 540 and the rotor 545.

The active clearance controller 575 integrates the feedback from the forward and aft sensors 565, 570 with the actuator movement and can be set to be either closed or open loop. In both instances, the active clearance controller 575 accounts for not only the positioning of the stator nozzle 535 and inter-stage seal 540 with respect to the rotor 545, but also the hanger 515 and shroud 520 with respect to the blade 525 on either side of the stator nozzle 535. The active clearance controller accounts for varying pressures and temperatures that create a flow from upstream (relatively higher pressure) to downstream (relatively lower pressure) on either side of the stator nozzle. A balance is maintained between the clearance allowed by inter-stage seal 540 and the rotor 545, the aft-side pressure between aft shroud 520*b* and aft blade 525*b*, and the forward-side pressure between forward shroud 520*a* and forward blade 525*a*. The pressure, and subsequently the clearance, is measured by an aft pressure sensor 570 and a forward pressure sensor 565. The active clearance controller 575 accounts for the pressure, the clearance, blade tip loss, nozzle rocking, and other engine parameters such as the power application, the altitude, etc. to adjust all actuators 550 and multilayer stacks 555. As each actuator 550 and multilayer stack 555 is connected to the rod 560 and subsequently the stator nozzle 535, the active clearance controller 575 has finite control radially inward and outward over the clearance between the inter-stage seal 540 and the rotor 545. Additionally, the use of piezoelectric material for multilayer stack 555 enables substantially real-time rapid response.

In a closed loop control system, a clearance calculation is utilized, where a target clearance is set. The actual clearance is calculated and compared to the target clearance. The clearance calculation includes an engine speed, a turbine pressure, a turbine temperature, a compressor temperature, and a compressor pressure to calculate the actual clearance. The actuator 550 with the multilayer stack 555 is then manipulated to achieve the target clearance. The calculation and actuator manipulation are performed in substantially real-time.

In an instance where the active clearance controller uses an open loop system to control the clearance, conversion curves are used to correlate a normalized pressure measurement with a clearance measurement (example conversion curves are provided in connection with FIGS. 7A-8B). First, the pressure is obtained from the pressure sensors 565, 570. Once the pressure is measured, the pressure is normalized and the conversion curve is used to calculate the clearance. The clearance is compared to a predetermined set value for clearance. The actuator 550 and multilayer stack 555 are then signaled by the active clearance controllerto achieve the target by moving the associated rod 560. The measurement, comparison and actuation are performed in substantially real-time to help ensure that proper clearance is maintained and rub/fragmentation events are avoided.

Figure 6:
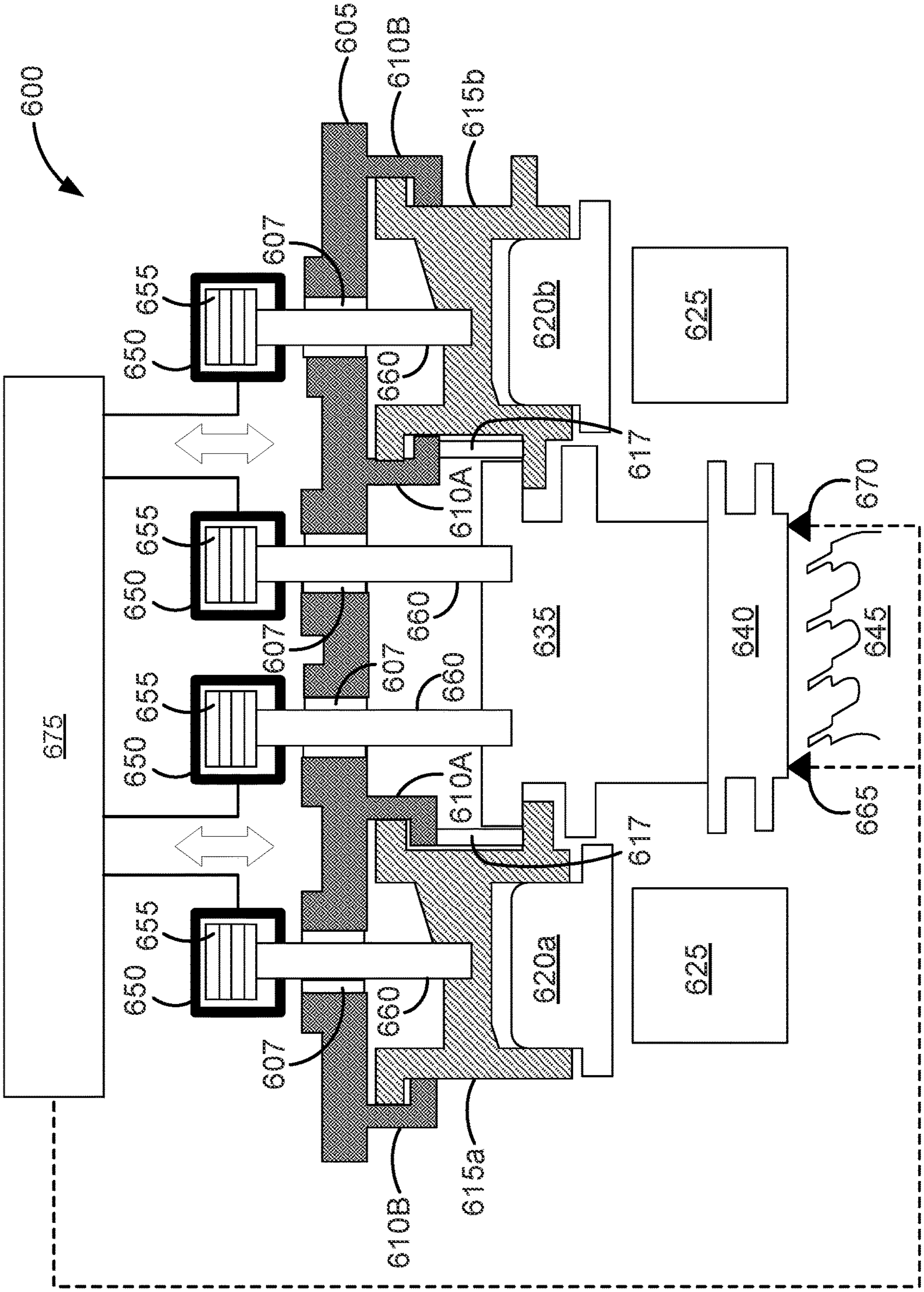
FIG. 6 is a schematic cross-sectional view of a third example ACC system for a high pressure turbine engine in accordance with teachings disclosed herein.

FIG. 6 shows an alternative implementation of an ACC system 600. The example ACC system 600 of FIG. 6 includes an active clearance controller 675, an actuator 650, a rod 660, a case 605, a hanger 615, a shroud 620, a blade 625, a stator nozzle 635, a mid-stage seal 617, a placement seal 607 to enable placement of the rod 660 through the case 605, and an inter-stage seal 640. The actuator 650 of FIG. 6 includes the multilayer stack 655, which is expanded (or elongated) in the radial direction and contracted in the axial direction. In examples disclosed herein, the case 605 includes the guiding hooks 610A, 610B, and the guiding hooks 610A, 610B connect the case 605 to the hanger 615. The hanger 615 is connected to the shroud 620. Also attached to the hangers is the stator nozzle 635 with the inter-stage seal 640 at the tip. Pressure sensors 665, 670 are on the forward and aft sides of the inter-stage seal 640. In this example, two actuator 650 and multilayer stack 655 sets are used to control the radial actuation of the stator nozzle 635 and the inter-stage seal 640 to control the clearance between the inter-stage seal 640 and rotor 645.

Stator nozzle rocking causes pressure imbalance. The pressure imbalance decreases the effectiveness of the seal, subsequently causing flow and deeper rubthan design intent, which changes the thermal conditions around seals and affects part life. There is an increased associated risk of potential part failure as the rocking and rub continues. Additionally, nozzle rocking causes flow path step unbalancing, which impacts aero efficiency. The utilization of two actuators and multilayer stacks connected to the stator nozzle 635 provides further control over nozzle rocking, which is uneven displacement of the forward and aft sides of the stator nozzle 635 and inter-stage seal 640. Equal displacement of the forward and aft sides of the inter-stage seal 640 yields improved control over airflow from the forward side to the aft side, resulting in less difficulty controlling a temperature and pressure differential, as relative to a stator nozzle 635 subject to nozzle rocking. The two actuators 650 and piezoelectric stacks 655 with rods 660 connected to the stator nozzle 635 are used in conjunction with actuators 650, multilayer stacks 655 and rods 660 connected to the hangers 615 and shrouds 620 to give complete control of temperature, pressure, and blade tip loss. The result is improvement in maintenance over the aero efficiency, maintenance of thermal conditions around the inter-stage seal 640, as well as prevention of negatively impacted part life.

In the illustrated examples of FIGS. 5 and 6, the actuator 550, 650 is located outside of the case 505, 605, so that the case 505, 605 encloses all components except the actuator 550, 650 and the active clearance controller 575, 675. In some examples, the case 505, 605 is a case surrounding a high pressure turbine (e.g., the HP turbine 118 of FIG. 1), a low pressure turbine (e.g., the LP turbine 120 of FIG. 1), and/or a compressor (e.g., the HP compressor 114 and LP compressor 112 of FIG. 1). In some examples, locating the actuator 550, 650 outside of the case 505, 605 prevents material temperature limitations from affecting the actuator 550, 650 by locating the insulation of the actuator box to preserve thermal condition. For example, hot gas temperatures in a high pressure turbine such as the HP turbine 118 of FIG. 1, can cause material limitations for the actuator 550, 650 if the actuator 550, 650 was located inside the case 505, 605. In the example ACC systems 500 and 600, the actuator 550, 650 includes a multilayer stack of piezoelectric material 555, 655. In some examples, the piezoelectric material of the multilayer stack 555, 655 includes quartz, topaz, etc. However, other piezoelectric materials or other materials that generate linear displacement such as, shape memory alloy (SMA) materials, etc., can be additionally and/or alternatively included. In some examples, locating the actuator 550, 650 and the multilayer stack 555, 655 outside of the case 505, 605 helps to preserve the piezoelectric material in a cold condition without concern of temperature limitations. The location of the actuator 550, 650 and the multilayer stack 555, 655 provides a benefit of easy access for maintenance and part replacement, for example.

Shape memory alloy materials are additionally and/or alternatively used to generate linear displacement. The insulation of actuator 550, 650 extends the limit of the thermal condition of the shape memory alloy materials in the actuators. The shape memory alloy materials are deformed based on the thermal condition. The thermal condition is controlled based on the electrical power supplied to the actuator 550, 650.

In the illustrated examples of FIGS. 5 and 6, the multilayer stack 555, 655 is connected to the rod 560, 660. The rod 560, 660 is connected to the stator nozzle 635 and inter-stage seal 640. Since the actuator 550, 650 and the multilayer stack 555, 655 are located outside of the case 505, 605, the rod 560, 660 is inserted through the case 505, 605 to connect to the multilayer stack 555, 655 and the stator nozzle 535, 635. In some examples, the opening in the case 505, 605 for the rod 560, 660 to be inserted through introduces possible leakage through the case 505, 605. In such examples, the rod 560, 660 is surrounded by the placement seal 507, 607 to seal the opening in the case 505, 605 that the rod 560, 660 is inserted through. In one example, the placement seal 507, 607 is a W-seal. In another example, a VSV sealing system or matured sealing technology is used. In an alternate example, a tube system fully sealed is used.

Figure 14:
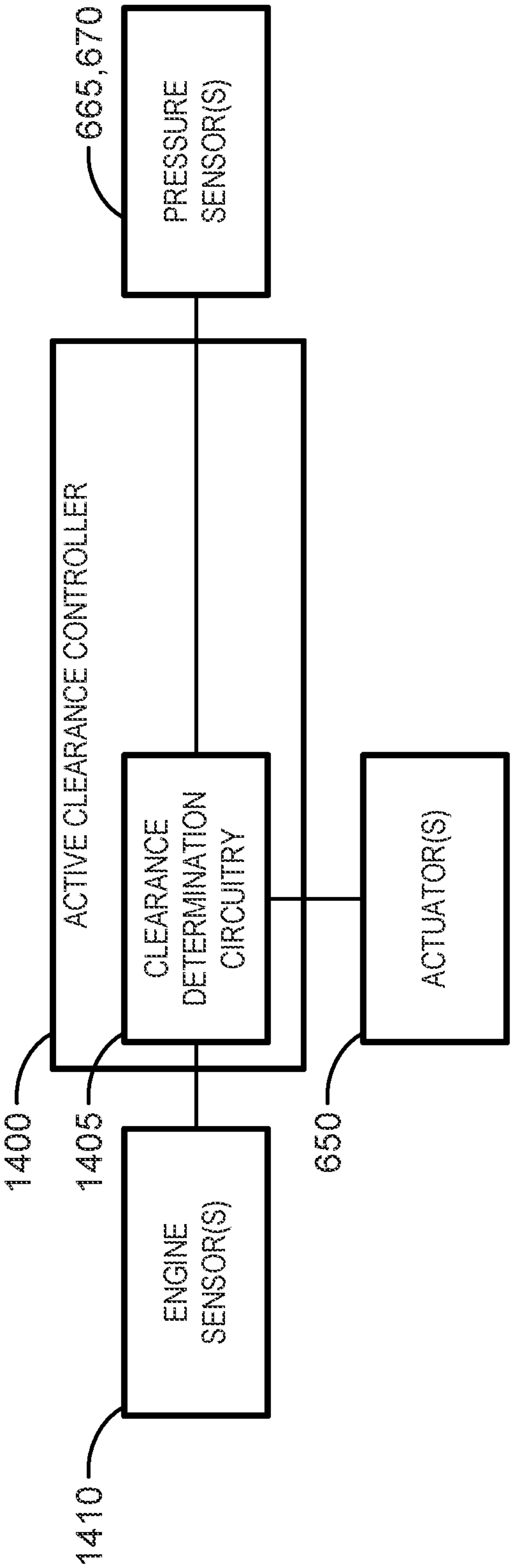
FIG. 14 is a block diagram of an Active Clearance Controller which can implement the examples disclosed herein.

In the illustrated examples of FIGS. 5 and 6, the multilayer stack 555, 655 generates a linear displacement of the rod 560, 660 from an electrical signal generated by an example active clearance controller 575, 675. An example implementation of the controller 575, 675 that generates the electrical signal is illustrated in FIG. 14, which is described in further detail below. In some examples, the rod 560, 660 moves the stator nozzle 635 using the linear displacement generated by the multilayer stack 555, 655. In the illustrated examples of FIGS. 5 and 6, the stator nozzle 535, 635 and inter-stage seal 540, 640 are connected and move together. Therefore, in the illustrated examples of FIGS. 5 and 6, the rod 560, 660 moves the stator nozzle 535, 635 and inter-stage seal 540, 640 using the linear displacement generated by the actuator 550, 650 and multilayer 555, 655. In some examples, the range of the linear displacement is increased by adding more layers of piezoelectric material to the multilayer stack 555, 655. For example, adding layers in the multilayer stack 555, 655, increase the radial movement range and muscle capability for the ACC system.

In the illustrated example of FIG. 5, the ACC system 500 has an open clearance represented by the opening between the shroud 520 and the blade 525. The multilayer stack 555 included in the actuator 550 controls the open clearance. In the ACC system 500, the actuator 550 receives a first electrical signal from an example controller, and the actuator 550 provides the first electrical signal to the multilayer stack 555. The first electrical signal causes a linear displacement of the multilayer stack 555 (e.g., each stack in the multilayer stack 555 is long and thin as seen in the example FIG. 5). An example range of linear displacement is 200 to 300 micrometers, which translates to 10 to 15 mils for muscle capability. The linear displacement of the multilayer stack 555 moves the rod 560 upwards (e.g., away from the blade 525). The rod 560 moves the hanger 515 and shroud 520 upwards (e.g., away from the blade 525), which increases the open clearance.

In the illustrated examples of FIGS. 5 and 6, the actuator 550, 650 adjusts the clearance in two directions (e.g., shrinkage and expansion). The actuator 550, 650 can be installed for an individual shroud (e.g., the shroud 520, 620), partial groups (e.g., subsets) of shrouds (e.g., for groups of three shrouds, for groups of five shrouds, etc.), or for an entire group or set of shrouds in a turbine (e.g., the shrouds surrounding the 360 degree inner surface of the case 505, 605). The actuator 550, 650 can also be installed for an individual stator nozzle (e.g., the stator nozzle 535, 635), partial groups (e.g., subsets) of stator nozzles (e.g., for groups of three stator nozzles, for groups of five stator nozzles, etc.), or for an entire group or set of stator nozzles in a turbine (e.g., the stator nozzles surrounding the 360 degree inner surface of the case 505, 605).

Figure 7A:
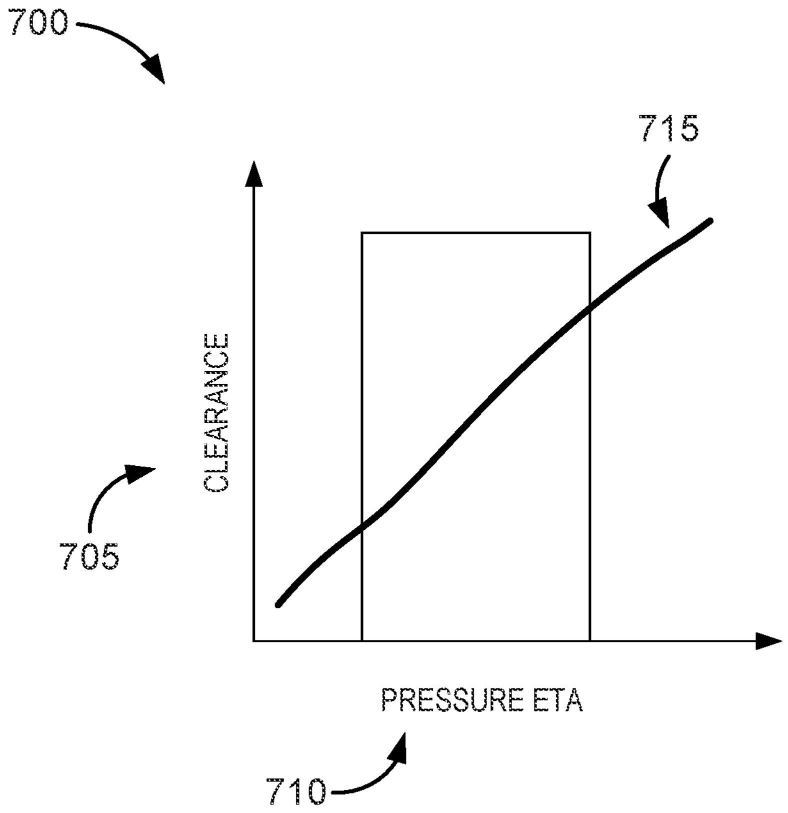
FIG. 7A is an example conversion curve determined using clearance and pressure efficiency for a new blade.
Figure 7B:
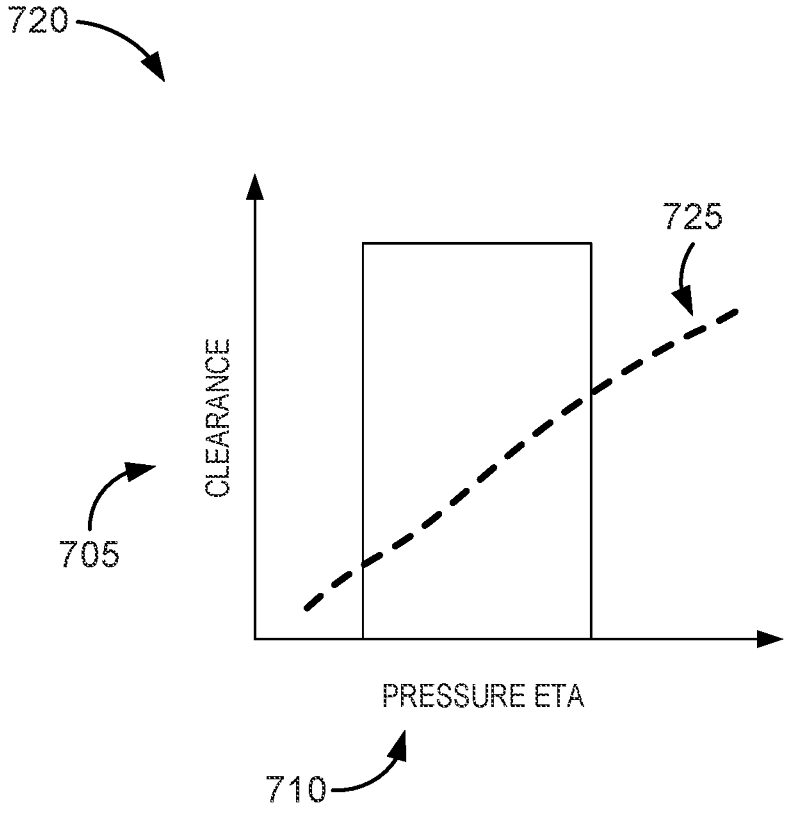
FIG. 7B is an example conversion curve determined using clearance and pressure efficiency for a blade with tip loss.

FIGS. 7A and 7B are example conversion curves 700, 720 of new versus deteriorated blade tip conditions. The curves graph the clearance 705 of the blade as a function of pressure efficiency (also referred to as Pη, Peta, or pressure eta) 710. Pressure efficiency can be defined as an assessed reference point differential from the pressure at a forward measurement divided by the reference point differential to a measured aft pressure (see equation 3). New conditions 715 are shown in the conversion curve 700 of FIG. 7A, whereas deteriorated blade conditions 725 are shown in the conversion curve 720 of FIG. 7B. As an example engine deteriorates and blade tip changes are observed, the offset from the conversion curve for new conditions occurs. This enables real-time tip loss assessment. For example, the active clearance controller 575 of FIG. 5 communicates with the forward pressure sensor 565 and aft pressure sensor 570 under new engine conditions. A reference pressure is obtained at the compressor exit (not shown). The active clearance controller calculates Pη 710 using equation (2), then uses the computed Pη 710 and a previously correlated conversion curve 700 with new conditions 715 plotted to determine the correlating amount of clearance 705. In the example where the engine conditions are deteriorated, a different conversion curve 720 with deteriorated blade conditions 725 plotted to correlate the amount of clearance 705 and to observe the offset from the conversion curve 700 for new engines. This amount of clearance 705 is then used to control the actuators 550 with multilayer stacks 555 to subsequently drive the inter-stage seal 540 to attain the clearance 705 between the inter-stage seal 540 and the rotor 545. In an example high power application with new engine conditions, the forward pressure is measured at 100 psia, the aft pressure is measured at 60 psia, and the reference pressure at the compressor exit is measured at 300 psia. From equation (2), Pη is calculated to be 0.83. FIG. 7A is then used to find the corresponding clearance to a Pη of 0.83. In an example high power application with deteriorated engine conditions, the forward pressure is measured at 90 psia, the aft pressure is measured at 50 psia, and the reference pressure at the compressor exit is measured at 250 psia. From equation (2), Pη is calculated to be 0.80. FIG. 7B is then used to find the corresponding clearance to a Pη of 0.80.

Figure 8A:
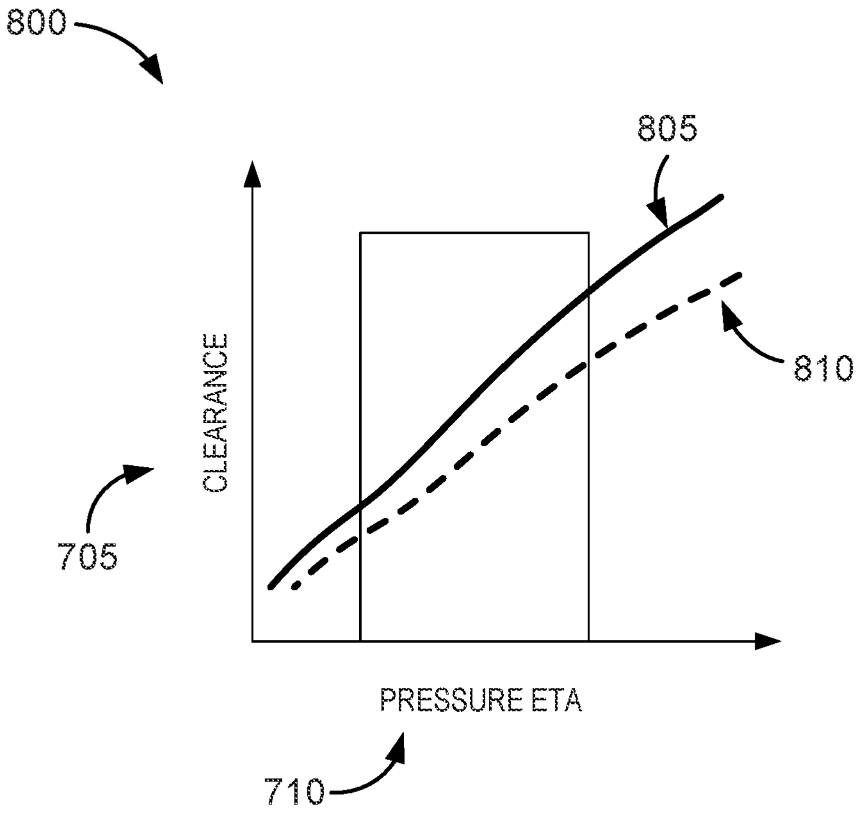
FIG. 8A illustrates an example conversion curve determined using clearance and pressure efficiency for both a new blade and a blade with tip loss during high power operation.
Figure 8B:
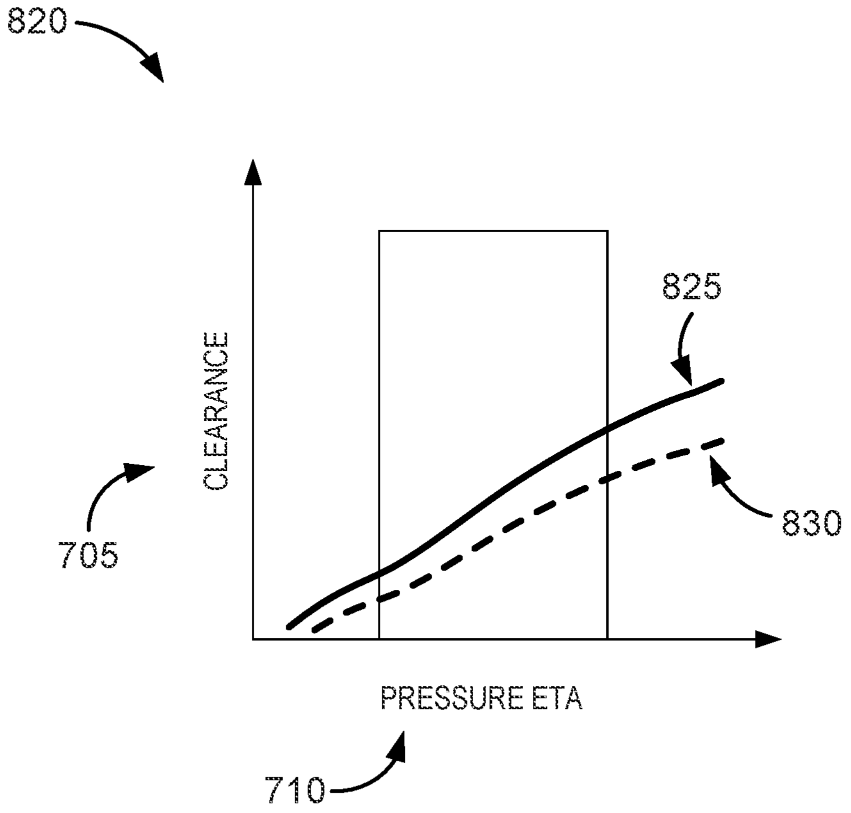
FIG. 8B illustrates an example conversion curve determined using clearance and pressure efficiency for both a new blade and a blade with tip loss during low power operation.

FIGS. 8A and 8B demonstrate example conversion curves 800, 820 for high power and low power operation, such as ground use or in-flight use, respectively. The conversion curve 800, 820 graphs the blade clearance 705 as a function of pressure efficiency 710 for new conditions 805, 825 and deteriorated conditions 810, 830. For example, active clearance controller 675 of FIG. 6 is in communication with a forward pressure sensor 665, an aft pressure sensor 670, and a reference compressor exit pressure sensor (not shown). The reference pressure, forward pressure, and aft pressure are measured during ground use operation (high power operation). After computing Pη 710 by using equation (2), the active clearance controller 675 uses conversion curve 800 with high power conditions plotted for new engine conditions 805 as well as deteriorated engine conditions 810 to determine the amount of clearance 705 that correlates to the given conditions. This amount of clearance 705 is then realized by moving the actuators 650 with multilayer stacks 655. The displacement of the stator nozzle 635 and inter-stage seal 640 are subsequently controlled by the expansion or contraction of the piezoelectric material within the multilayer stacks 655. Given low power conditions, such as in-flight cruise conditions, an example low power conversion curve 820 is used instead to plot the Pη 710 against clearance 705 for both new engine conditions 825 and deteriorated engine conditions 830. In an example high power application with new engine conditions, the forward pressure is measured at 100 psia, the aft pressure is measured at 60 psia, and the reference pressure at the compressor exit is measured at 300 psia. From equation (2), Pη is calculated to be 0.83. FIG. 8A is then used to find the corresponding clearance to a Pη of 0.83. In an example high power application with deteriorated engine conditions, the forward pressure is measured at 90 psia, the aft pressure is measured at 50 psia, and the reference pressure at the compressor exit is measured at 250 psia. From equation (2), Pη is calculated to be 0.80. FIG. 8A is then used to find the corresponding clearance to a Pη of 0.80. In an example low power application with new engine conditions, the forward pressure is measured at 60 psia, the aft pressure is measured at 30 psia, and the reference pressure at the compressor exit is measured at 150 psia. From equation (2), Pη is calculated to be 0.75. FIG. 8B is then used to find the corresponding clearance to a Pη of 0.75. In an example low power application with deteriorated engine conditions, the forward pressure is measured at 50 psia, the aft pressure is measured at 20 psia, and the reference pressure at the compressor exit is measured at 120 psia. From equation (2), Pη is calculated to be 0.70. FIG. 8B is then used to find the corresponding clearance to a Pη of 0.70.

Figure 9A:
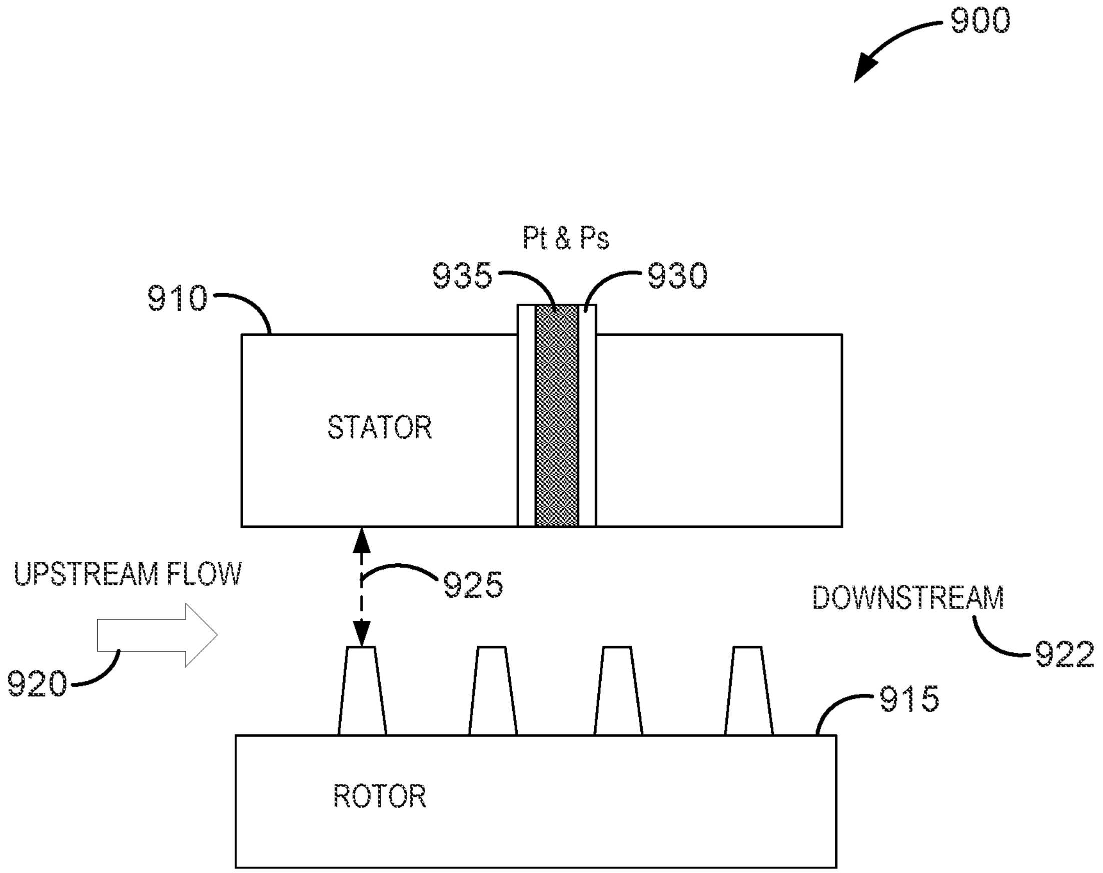
FIG. 9A illustrates an example one-point pressure measurement at a mid-point.
Figure 9B:
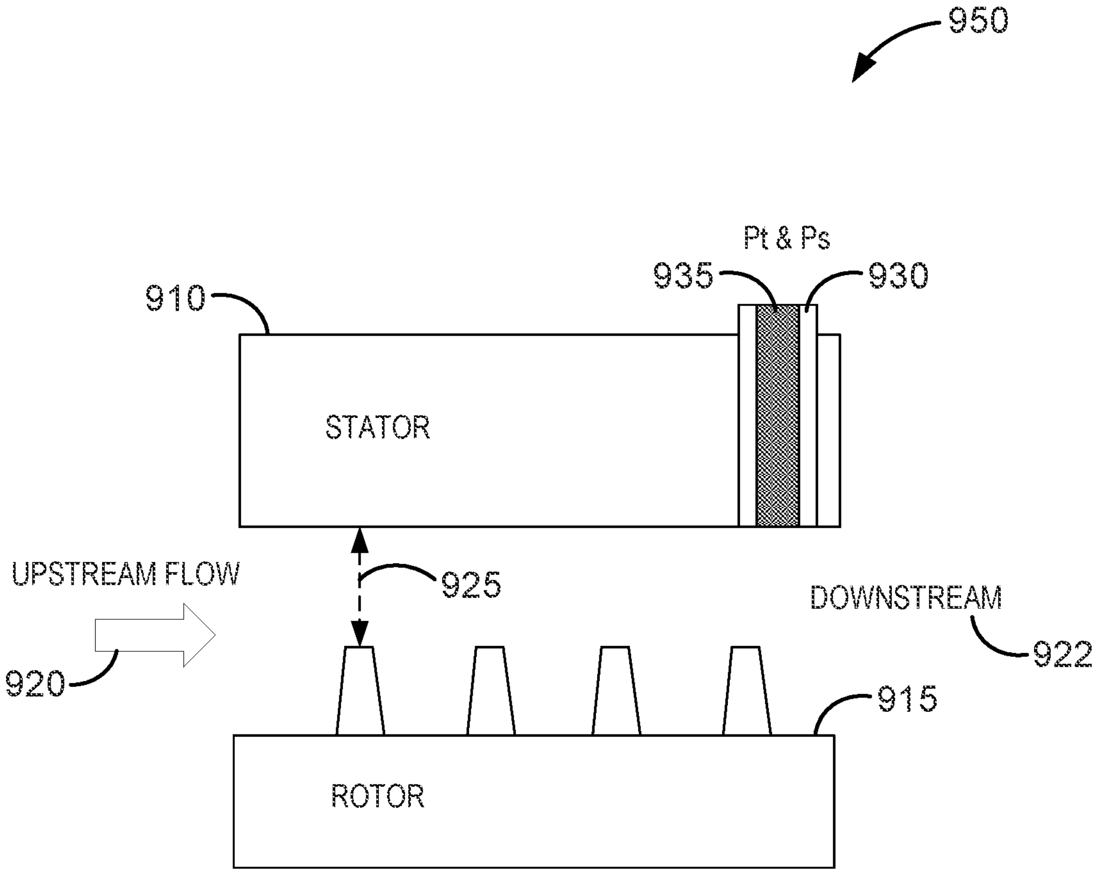
FIG. 9B illustrates an example one-point pressure measurement at an aft-point.

FIGS. 9A and 9B illustrate state diagrams indicating a progression of air flow and pressure of real-time inter-stage seal clearance assessment by one-point pressure measurement at a midpoint 900 or an aft point 950. Airflow moves from a forward point upstream 920 to an aft point downstream 922. The inter-stage seal clearance 925 is shown between the stator 910 and rotor 915. In FIG. 9A, total pressure (Pt) 930 and static pressure (Ps) 935 are measured at the same mid-point on the stator 910. In FIG. 9B, Pt and Ps are measured at the same aft point on the stator 910. Pη is calculated from a reference point (a compressor exit pressure (not shown)) differential to the static pressure 935 divided by the reference point differential to the total pressure 930. An example Pη calculation is shown below in equation 1.

$$P\eta = \frac{(P_{ref} - P_s)}{(P_{ref} - P_t)} \tag{1}$$

Figure 10A:
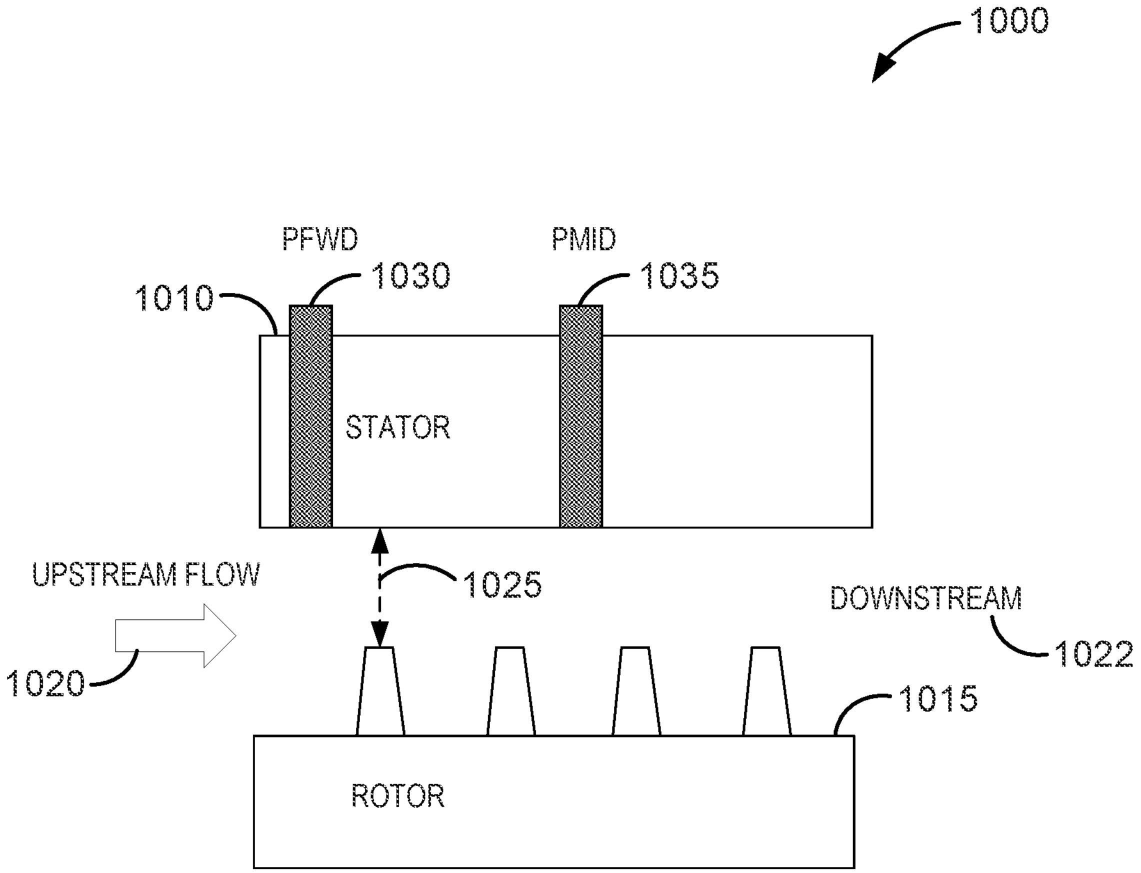
FIG. 10A illustrates a two-point pressure measurement method at forward and mid points.
Figure 10B:
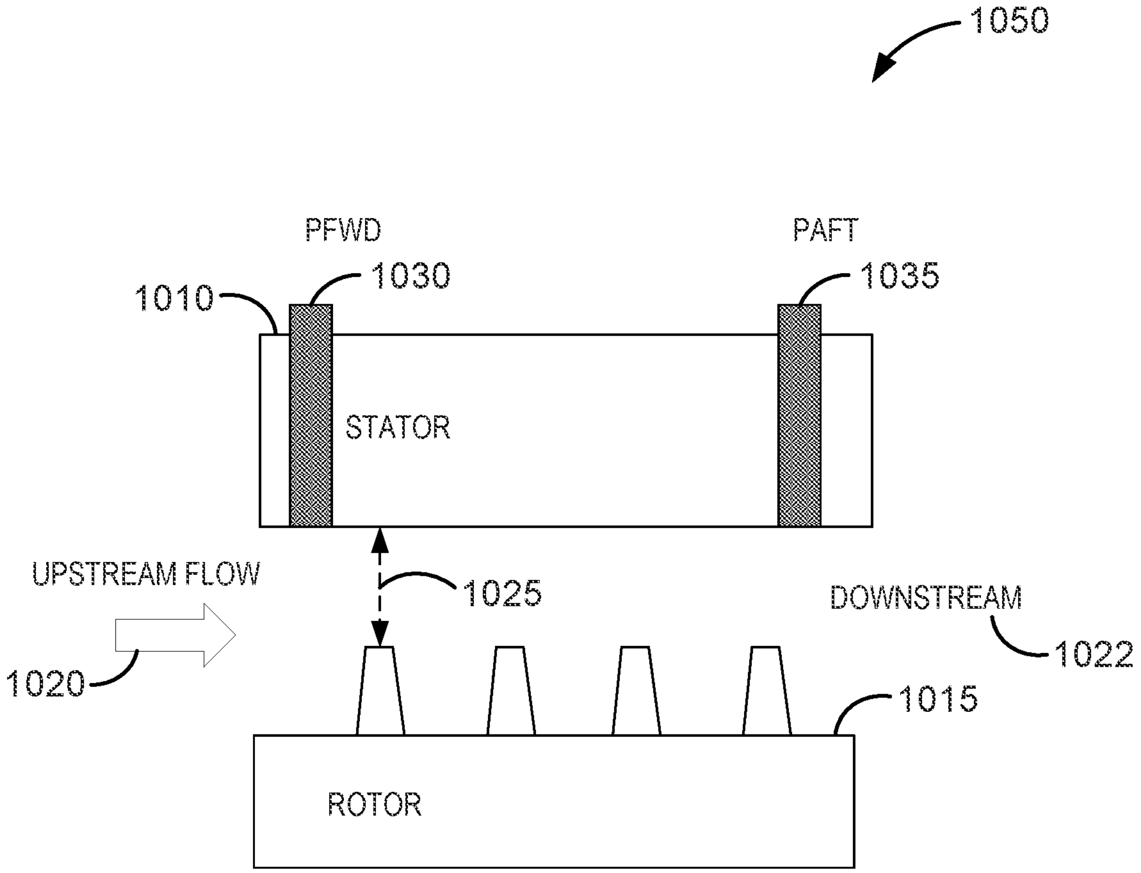
FIG. 10B illustrates a two-point pressure measurement method at forward and aft points.

FIGS. 10A and 10B illustrate methods of real-time inter-stage seal clearance assessment by two-point pressure measurement at a forward-mid measurement system 1000 or a forward-aft point measurement system 1050. Airflow moves from a forward point upstream 1020 to an aft point downstream 1022. The inter-stage seal clearance 1025 is shown between the stator 1010 and rotor 1015. In FIG. 10A, forward pressure (Pfwd) 1030 and midpoint pressure (Pmid) 1035 are measured on the stator 1010. In FIG. 9B, Pfwd and the aft pressure are measured on the stator 910. Pη is calculated from a reference point (a compressor exit pressure (not shown)) differential to the forward pressure 1030 divided by the reference point differential to the aft pressure 1040. An example Pη calculation is shown below in equation 2.

$$P\eta = \frac{(P_{ref} - P_{fwd})}{(P_{ref} - P_{aft})} \tag{2}$$

Figure 11A:
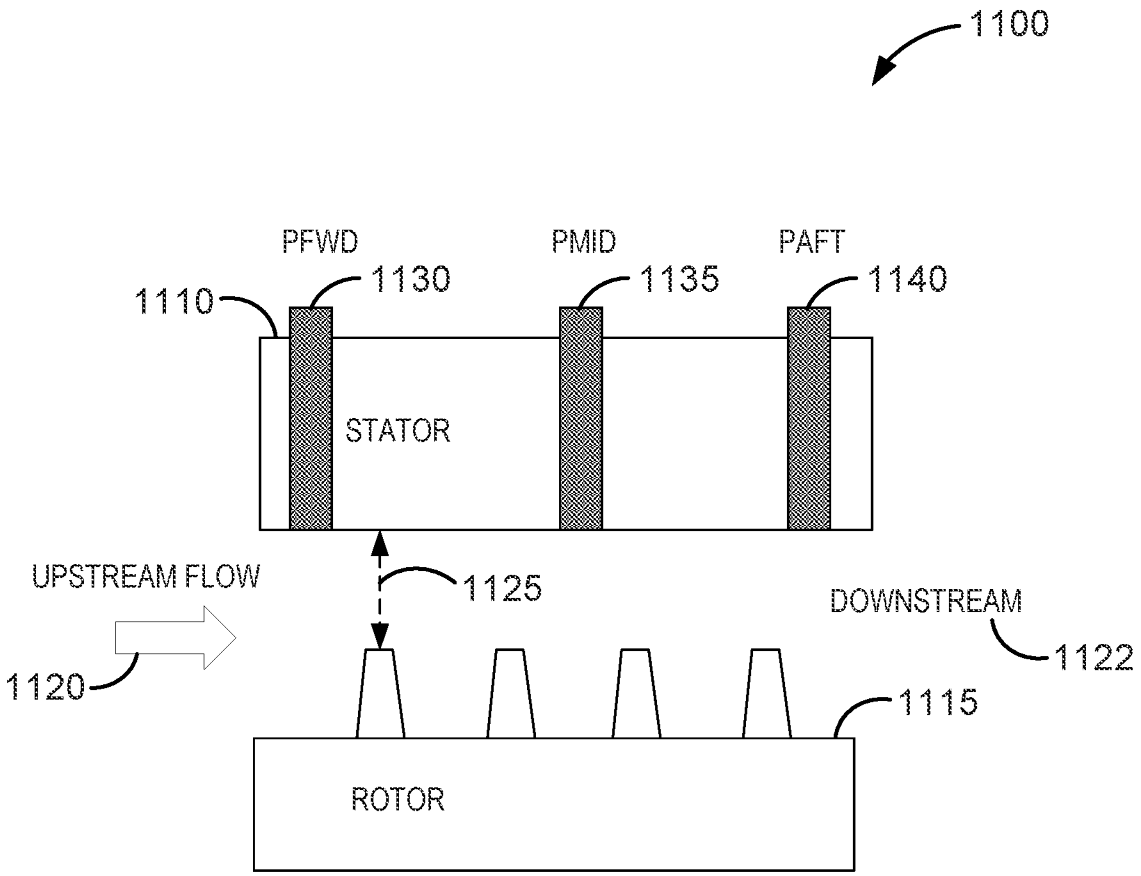
FIG. 11A illustrates a first three-point pressure measurement method at forward, mid, and aft points.
Figure 11B:
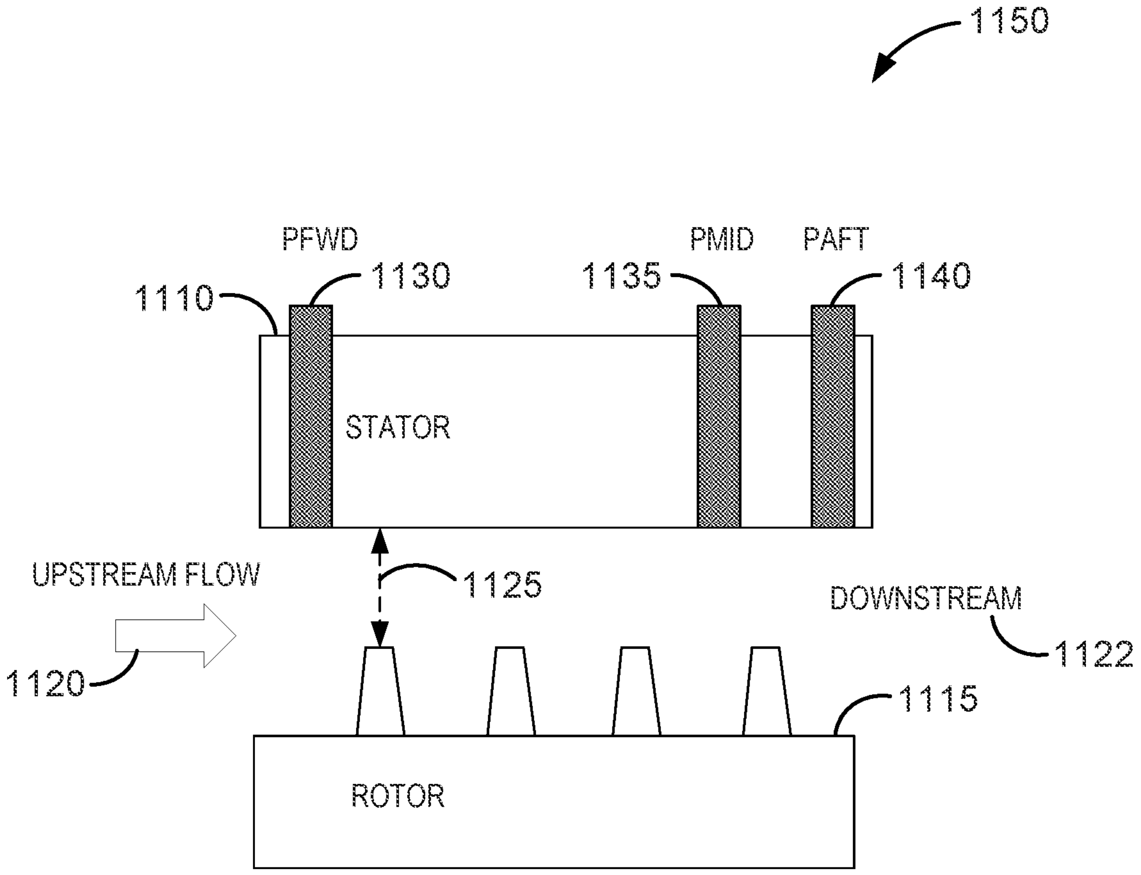
FIG. 11B illustrates a second three-point pressure measurement method at forward, mid, and aft points.

FIGS. 11A and 11B illustrate methods of real-time seal clearance assessment by three-point pressure measurement system 1100, 1150 at a forward point 1130, midpoint 1135 and an aft point 1140. Airflow moves from a forward point upstream 1120 to an aft point downstream 1122. The inter-stage seal clearance 1125 is shown between the stator 1110 and rotor 1115. Pη is calculated from the forward point 1130 differential to the midpoint 1135 divided by the forward point 1130 differential to the aft pressure 1140. An example Pη calculation is shown below in equation 3.

$$P\eta = \frac{(P_{fwd} - P_{mid})}{(P_{fwd} - P_{aft})} \tag{3}$$

Figure 12:
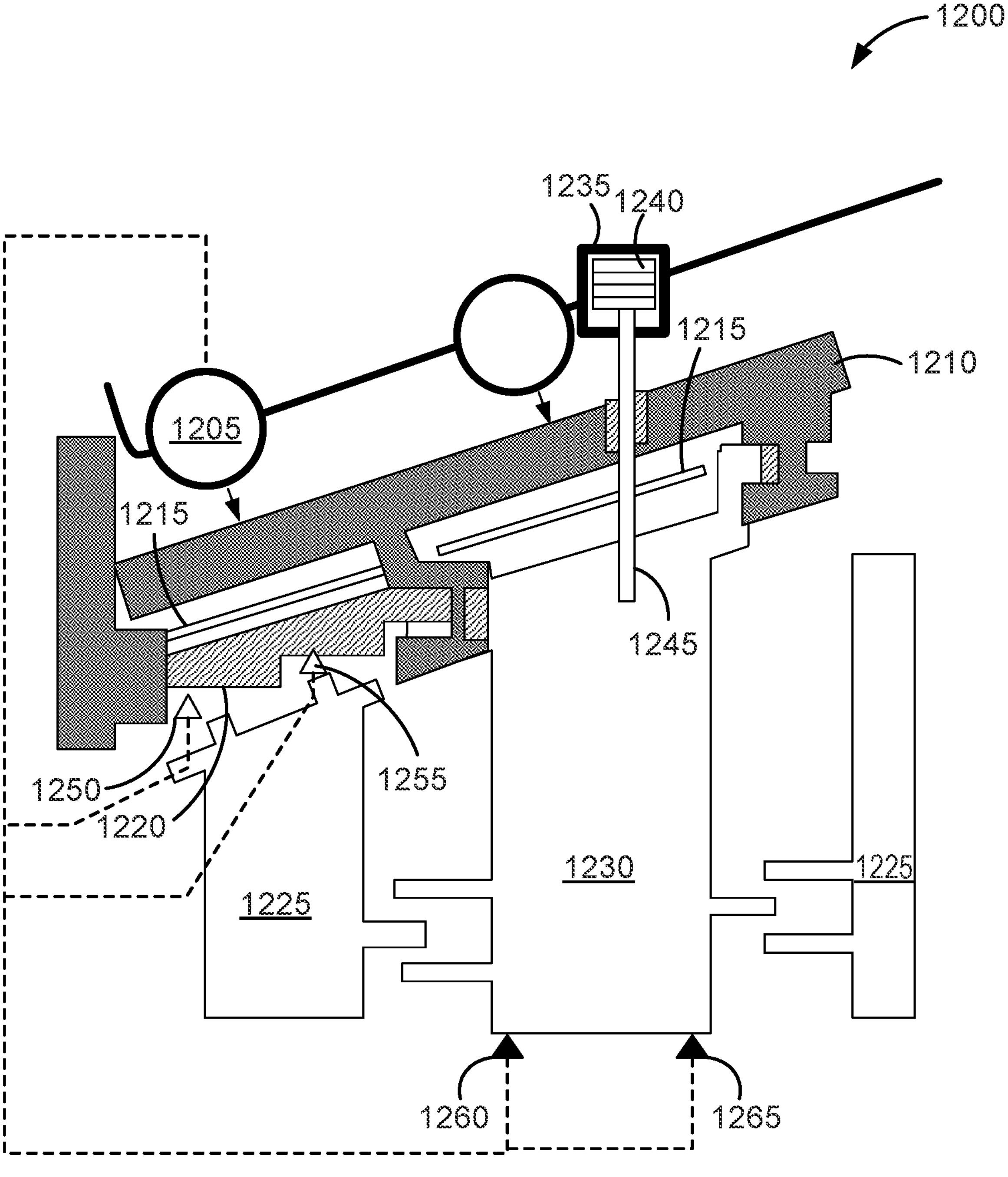
FIG. 12 is a schematic cross-sectional view of a second example ACC system for a low pressure turbine engine in accordance with teachings disclosed herein.
Figure 13:
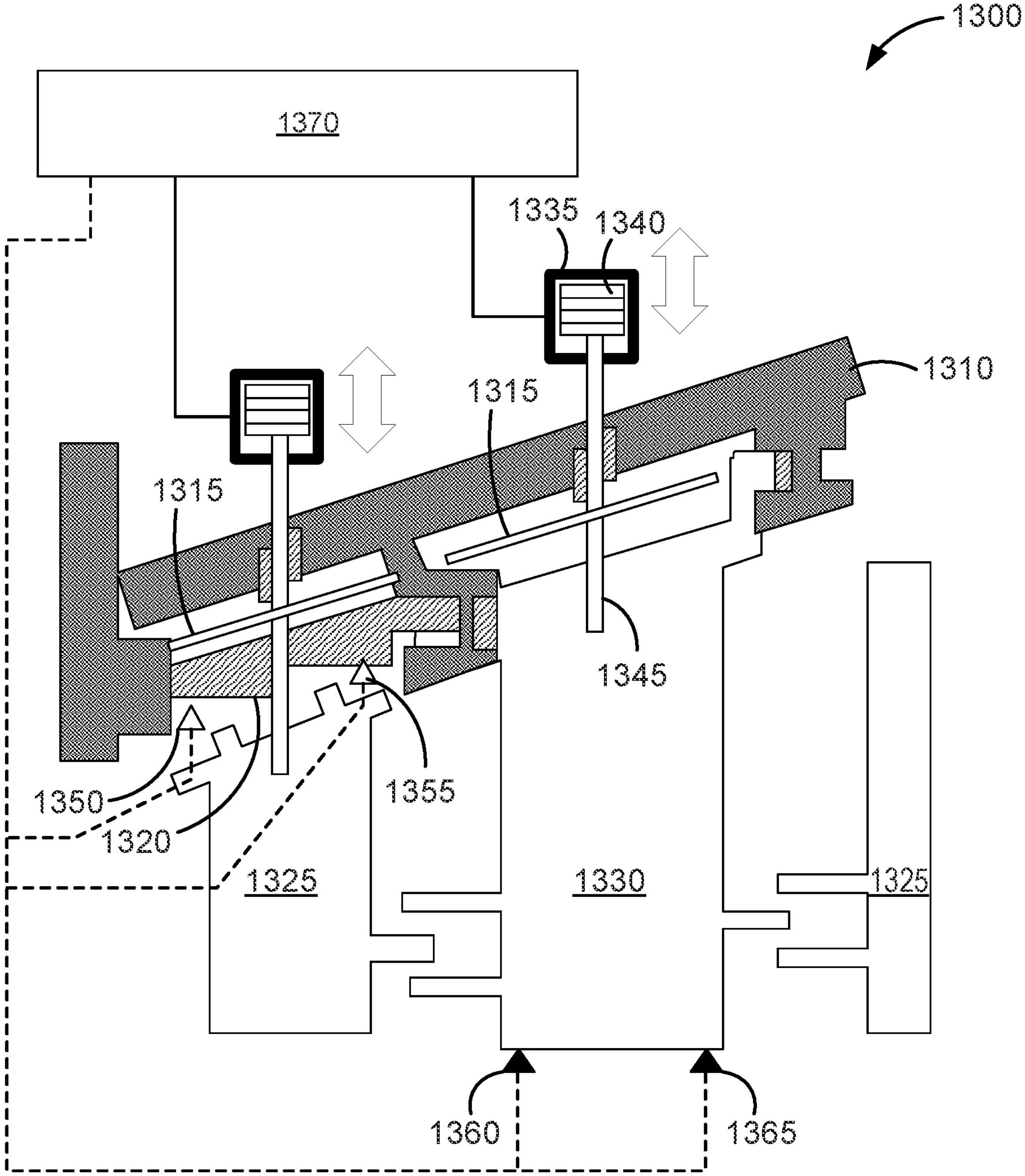
FIG. 13 is a schematic cross-sectional view of a third example ACC system for a low pressure turbine engine in accordance with teachings disclosed herein.

The pressure measurement methods described in FIGS. 9A to 11B can be combined with the illustrated example HPT systems of FIGS. 5 and 6, or the example LPT systems of FIGS. 12 and 13. The single point measurement method provides a simple design with one piece of instrumentation and variation of the installation location, but the total static pressure instrumentation is a complex design and life limit. For the two point measurement method, two pieces of instrumentation are used, but the flexibility for instrumentation exists. The static pressure measurement using a conventional transducer is designed to last longer than the single point measurement method. In the three point measurement method, a greater complexity of instrumentation installation is involved, but three probes yield a greater amount of data and improve the accuracy of the measurements as relative to the single and two point measurement methods.

FIG. 12 is a schematic cross-sectional view of an example LPT implementation of an ACC system 1200 in accordance with the teachings disclosed herein. FIG. 12 is a combination of a conventional ACC tip clearance control system and an interstage seal piezo system. The example system 1200 includes ACC 1205, engine case 1210, honeycomb shroud 1220, heat shields 1215, airfoils 1225, stator nozzle 1230, pressure sensors 1250, 1255, 1260, 1265, actuator 1235 with multilayer stack 1240, and rod 1245. In this example, two pressure sensors 1250, 1255 are used for the tip control, but are used in open loop control with feedback of the actual measurement of clearance. To contrast the pressure sensors used for tip control, two additional pressure sensors 1260, 1265 are used for inter-stage seal control. The heat shield 1215 is used to isolate the engine case 1210 from heat resultant from hot gas. In this example, the pressure sensors collect pressure data and send the collected pressure data to an active clearance controller 1205. The active clearance controller 1270 includes an open loop and/or closed loop controller, as previously discussed. The controller 1270 integrates the sensor data to send a signal to actuator 1235 and example multilayer stack 1240 to expand or contract the piezoelectric material within the multilayer stack 1240 to move the rod 1245, and subsequently the stator nozzle 1230, radially inward and outward in substantially real-time. For example, the active clearance controller 1270 measures the forward pressure and aft pressure from the forward pressure sensor 1260 and aft pressure sensor 1265 respectively.

FIG. 13 is a schematic cross-sectional view of a second example LPT implementation of an ACC system 1300 in accordance with the teachings disclosed herein. The example system 1300 includes an ACC 1370, an engine case 1310, a honeycomb shroud 1320, heat shields 1315, airfoils 1325, a stator nozzle 1330, pressure sensors 1350, 1355, 1360, 1365, an actuator 1335 with a multilayer stack 1340, and a rod 1345. In this example, the pressure sensors collect pressure data and send it to the active clearance controller 1370. The active clearance controller 1370 includes an open loop and/or closed loop controller as previously discussed. The controller integrates the sensor data to send a signal to the actuator 1335 and the multilayer stack 1340 to expand or contract the piezoelectric material within the multilayer stack to move the rod 1345, and subsequently the stator nozzle 1330, radially inward and outward. In this example, there is a second actuator 1335 and multilayer stack 1340 connected to a second rod 1345 and the shroud 1320. In this example the second actuator 1335 controls the airfoil tip clearance to maximize engine performance.

FIG. 14 is a block diagram of an example controller 1400 of an example ACC system such as the ACC systems 500, 600, 1200, 1300 in FIGS. 5, 6, 12 and 13 in accordance with the examples disclosed herein. In FIG. 14, the controller 1400 can be a full-authority digital engine control (FADEC) unit, an engine control unit (ECU), an electronic engine control (EEC) unit, etc., and/or any other type of data acquisition and/or control computing device, processor platform (e.g., processor-based computing platform), etc. The controller 1400 communicates with the example pressure sensor(s) 665, 670, engine sensor(s) 1410, and actuator(s) 650. The controller 1400 includes an example clearance determination circuitry.

In the illustrated example of FIG. 14, the controller 1400 receives values for a plurality of input variables relating to flight condition (e.g., air density, throttle lever position, engine temperatures, engine pressures, direct clearance measurements, indirect clearance measurements, etc.). The controller 1400 receives the flight condition data from the engine sensor(s) 1410. The engine sensor(s) 1410 can be mounted on the gas turbine engine 100 and/or positioned elsewhere in the aircraft (e.g., on wing, in cockpit, in main cabin, in engine compartment, in cargo, etc.). The communication between the controller 1400 and the engine sensor(s) 1410 can be one-way communication and/or two-way communication, for example. The controller 1400 computes engine operating parameters such as fuel flow, stator nozzle position, air bleed valve position, etc., using the flight condition data. The controller 1400 also gets feedback data from pressure sensors 665 and 670. For example, the controller 1400 is constantly monitoring engine conditions through engine sensors 1410. The engine sensors indicate the operational parameters of the engine, such as the altitude, temperature, air speed, etc. The controller 1400 computes the fuel flow, stator nozzle position and other operating parameters with the data received from the engine sensors 1410. The controller 1400 integrates all of the data and leverages the clearance determination circuitry 1405 to actuate the actuators 650 that are connected.

In the illustrated example of FIG. 14, the clearance determination circuitry 1405 obtains the sensor data from the example engine sensor(s) 1410. The sensor data includes the flight condition data obtained from the gas turbine engine 100. The clearance determination circuitry 1405 monitors engine conditions based on the sensor data from the engine sensor(s) 1410. In some examples, the clearance determination circuitry 1405 determines if the turbine case is expanding or shrinking based on the engine conditions determined from the obtained flight condition data. In the illustrated example of FIG. 14, the clearance determination circuitry 1405 generates electrical signals to the actuator(s) 650 of an ACC system. For example, the clearance determination circuitry 1405 obtains sensor data from the engine sensors 1410 regarding temperature in the engine casing. The clearance determination circuitry 1405 determines from this engine sensor data that the turbine case is shrinking. From the pressure sensor data also obtained from the pressure sensors 665, 670, the clearance determination circuitry 1405 calculates the $P\eta$ and correlates the $P\eta$ value to a clearance value. The clearance determination circuitry 1405 then sends electrical signals to the actuators 650 to attain the determined clearance and ensure a proper clearance is maintained.

Figure 15:
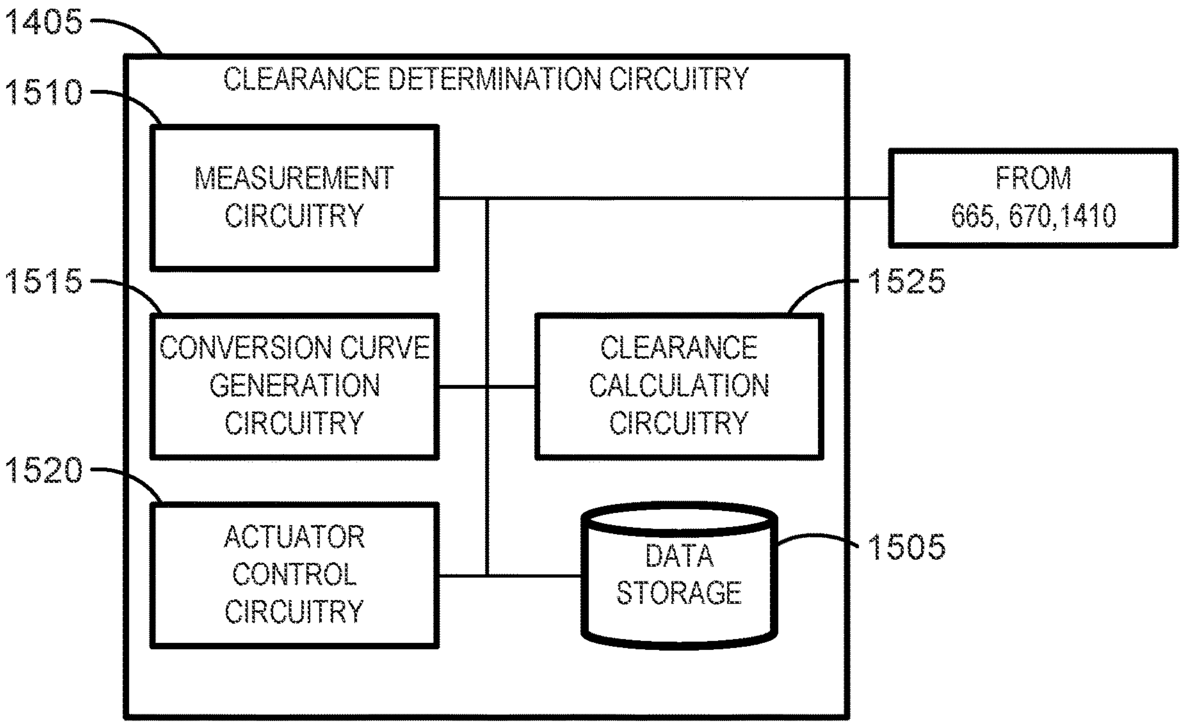
FIG. 15 is a block diagram of the clearance determination circuitry of FIG. 14.

FIG. 15 is a block diagram of an example implementation of the clearance determination circuitry 1405 of FIG. 14 to compute clearance determination calculations. The clearance determination circuitry 1405 of FIG. 15 may be instantiated (e.g., creating an instance of, bring into being for any length of time, materialize, implement, etc.) by programmable circuitry such as a Central Processor Unit (CPU) executing first instructions. Additionally or alternatively, the clearance determination circuitry of FIG. 15 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 15 may, thus, be instantiated at the same or different times. Some or all of the circuitry of FIG. 15 may be instantiated, for example, in one or more threads executing concurrently on hardware and/or in series on hardware. Moreover, in some examples, some or all of the circuitry of FIG. 15 may be implemented by microprocessor circuitry executing instructions and/or FPGA circuitry performing operations to implement one or more virtual machines and/or containers.

The clearance determination circuitry 1405 includes example measurement circuitry 1510, example conversion curve generation circuitry 1515, example actuator control circuitry 1520, example clearance calculation circuitry 1525, and example data storage 1505.

Figure 16:
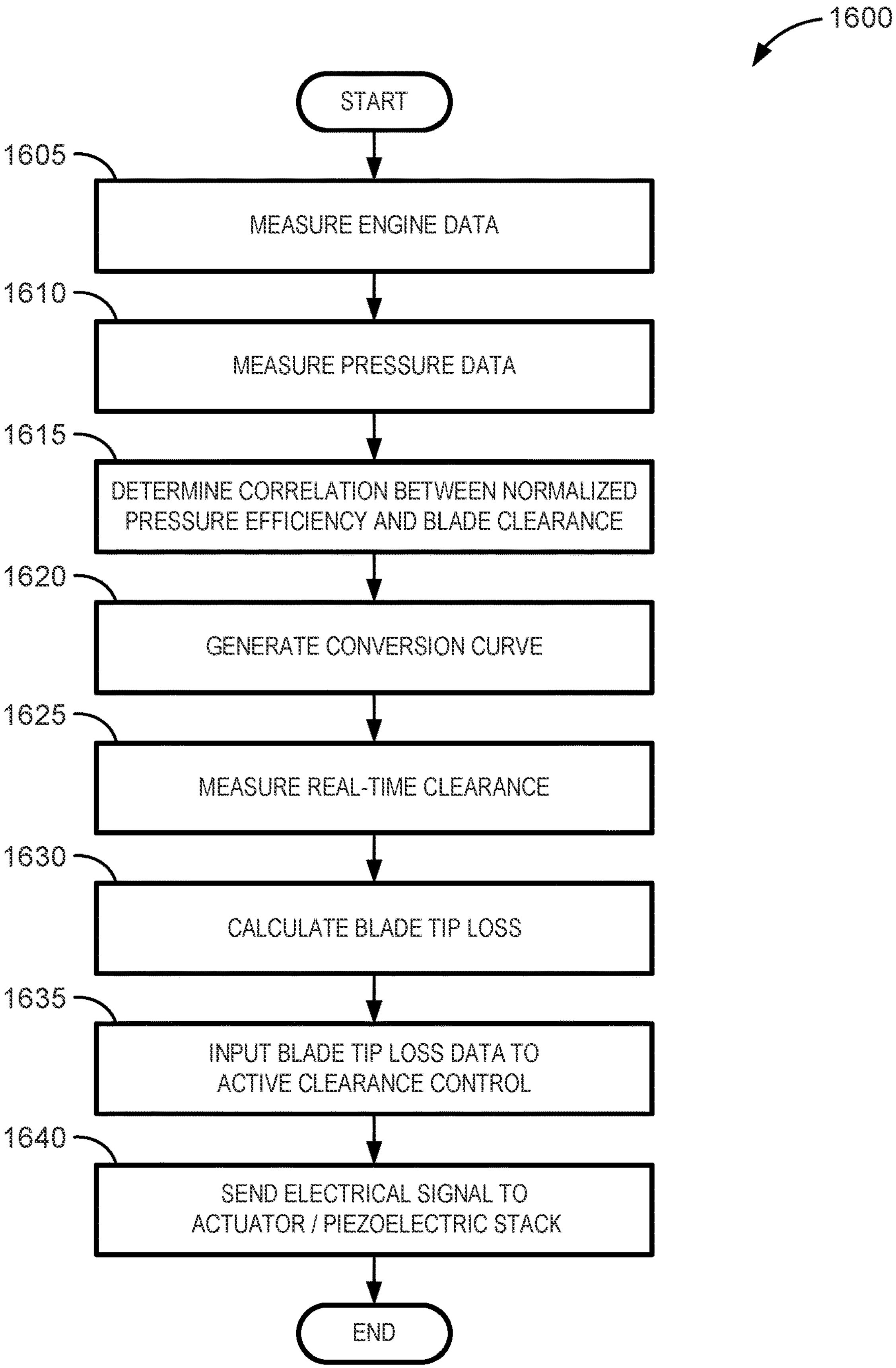
FIG. 16 illustrates a flowchart representative of example machine readable instructions which may be executed to implement the example clearance determination circuitry of FIG. 15.

In some examples, the measurement circuitry 1510 is instantiated by programmable circuitry executing sensor measurement instructions and/or configured to perform operations such as those represented by the flowchart(s) of FIG. 16.

In some examples, the conversion curve generation circuitry 1515 is instantiated by programmable circuitry executing conversion curve generation instructions and/or configured to perform operations such as those represented by the flowchart(s) of FIG. 16.

In some examples, the clearance calculation circuitry 1525 is instantiated by programmable circuitry executing clearance calculation instructions and/or configured to perform operations such as those represented by the flowchart(s) of FIG. 16.

In some examples, the actuator control circuitry 1520 is instantiated by programmable circuitry executing actuator control instructions and/or configured to perform operations such as those represented by the flowchart(s) of FIG. 16.

In some examples, the clearance determination circuitry 1405 includes means for determining a clearance. For example, the means for determining may be implemented by clearance determination circuitry 1405. In some examples, the clearance determination circuitry 1405 may be instantiated by programmable circuitry such as the example programmable circuitry 1712 of FIG. 17. For instance, the clearance determination circuitry 1405 may be instantiated by an example microprocessor executing machine executable instructions such as those implemented by at least blocks 1625, 1630 of FIG. 16. In some examples, the clearance determination circuitry 1405 may be instantiated by hardware logic circuitry, which may be implemented by an ASIC, XPU, or FPGA circuitry configured and/or structured to perform operations corresponding to the machine readable instructions. Additionally or alternatively, the clearance determination circuitry 1405 may be instantiated by any other combination of hardware, software, and/or firmware. For example, the clearance determination circuitry 1405 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

Example measurement circuitry 1510 measures engine component data and pressure data from engine sensor(s) and pressure sensor(s) 665, 670. The measurement may be performed using one or more sensor(s) (e.g., a conventional static pressure sensor, an optical sensor, a laser-based sensor, a capacitive sensor, an Eddy current sensor, a microwave sensor, etc.). In some examples, the example measurement circuitry 1510 initiates a measurement at an aft, a mid, and/or a front location relative to a given clearance gap, as determined based on the direction of combustive gas airflow. In some examples, during initial testing to develop conversion curves that correlate pressure to clearance measurements, the measurement circuitry 1510 can determine when to initiate pressure measurement(s) based on a given power level (e.g., low power, high power), a specific altitude (e.g., at 35,000 feet, etc.), ambient temperature, and/or a specific flight cycle (e.g. take-off, cruise, landing, etc.). In an example, a mid-size engine has a core speed (PCN25%) in the range of 105 to 110 percent for a high power level, whereas PCN25% is between 75 and 85 percent for a low power level, and PCN25% is 85 to 105 percent for a mid level example.

The example conversion curve generation circuitry 1515 generates the conversion curves as exemplified in FIGS. 7A-8B. The example conversion curves account for a multitude of factors such as altitude, power application, and/or flight cycle. The example conversion curves are used to determine the relationship between pressure efficiency ($P\eta$) and clearance. For example, the example conversion curve generation circuitry 1515 receives input from the engine and pressure sensor(s) 665, 670, 1410 and calculates a normalized pressure efficiency curve. Accordingly, a given clearance (mils) can be determined based on the pressure measurements. This enables the clearance determination circuitry 1405 to develop a conversion curve that can be used to identify offset from the curve due to blade tip loss to achieve a more accurate clearance gap adjustment in real-time from the pressure measurement data.

The example clearance calculation circuitry 1525 takes the data from the measurement circuitry 1510, the generated conversion curves from the conversion curve generation circuitry 1515 and calculates the actual clearance. The example clearance calculation circuitry 1525 then compares the actual clearance to the target clearance, retrieved from data storage 1505. The difference in clearances is the clearance adjustment to be made.

The example actuator control circuitry 1520 takes the clearance adjustment data from the clearance calculation circuitry 1525. The example actuator control circuitry 1520 is in communication with the actuator 650 of FIG. 6 and sends a signal to adjust the actuator 650 with the multilayer stack 655 to contract or expand the associated clearance.

In the example in which a plurality of actuators 650 and a plurality of multilayer stacks 655 are used, the clearance calculation circuitry 1525 compensates for nozzle rocking and for the inter-stage seal clearance, both of which are inter-dependent on a forward hanger 615*a* and forward shroud 620*a* clearance with respect to a blade 625, and an aft hanger 615*b* and aft shroud 620*b* to a blade 625.

The example data storage 1505 can be used to store any information associated with the example clearance determination circuitry 1405. For example, the data storage 1505 can store pressure measurements obtained using one or more pressure sensor(s) 665, 670, 1410, conversion curve(s) generated using the conversion curve generation circuitry 1515, and/or clearance calculation circuitry 1525 output used by the actuator control circuitry 1520 to make clearance adjustments based on real-time data. The example data storage 1505 of the illustrated example of FIG. 15 is implemented by any memory, storage device and/or storage disc for storing data such as flash memory, magnetic media, optical media, etc. Furthermore, the data stored in the example data storage 1505 can be in any data format such as binary data, comma delimited data, tab delimited data, structured query language (SQL) structures, image data, etc.

While an example implementation of the clearance determination circuitry 1405 of FIG. 14 is illustrated in FIG. 15, one or more of the elements, processes, and/or devices illustrated in FIG. 15 may be combined, divided, re-arranged, omitted, eliminated, and/or implemented in any other way. Further, the measurement circuitry 1510, conversion curve generation circuitry 1515, clearance calculation circuitry 1525, actuator control circuitry 1520, and/or, more generally, the example clearance determination circuitry 1405 of FIG. 15, may be implemented by hardware alone or by hardware in combination with software and/or firmware. Thus, for example, any of the measurement circuitry 1510, conversion curve generation circuitry 1515, clearance calculation circuitry 1525, actuator control circuitry 1520, and/or, more generally, the example clearance determination circuitry 1405, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example clearance determination circuitry 1405 of FIG. 15 may include one or more elements, processes, and/or devices in addition to, or instead of, those illustrated in FIG. 15, and/or may include more than one of any or all of the illustrated elements, processes and devices.

A flowchart representative of example machine readable instructions, which may be executed by programmable circuitry to implement and/or instantiate the clearance determination circuitry 1405 of FIGS. 14 and/or 15 and/or representative of example operations which may be performed by programmable circuitry to implement and/or instantiate the clearance determination circuitry 1405 of FIG. 15, is shown in FIG. 16. The machine readable instructions may be one or more executable programs or portion(s) of one or more executable programs for execution by programmable circuitry such as the programmable circuitry 1712 shown in the example processor platform 1700 discussed below in connection with FIG. 17 and/or may be one or more function(s) or portion(s) of functions to be performed by the example programmable circuitry (e.g., an FPGA). In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIG. 16, many other methods of implementing the example clearance determination circuitry 1405 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 16 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 16 is a flowchart representative of machine readable instructions that can be executed to implement the example active clearance controller 1400 of FIG. 15 in conjunction with the example ACC system of FIGS. 5, 6, 12, and 13. The program 1600 of FIG. 16 begins execution at block 1605, at which the example measurement circuitry 1510 obtains sensor data from the example engine sensor(s) 1410. In some examples, the sensor data includes the flight condition data obtained by the engine sensor(s) 1410 from an engine (e.g., the gas turbine engine 100 of FIG. 1). In some examples, flight condition data of the sensor data includes values for a plurality of input variables relating to flight conditions (e.g., air density, throttle lever position, engine temperatures, engine pressures, etc.). The sensor data varies depending on the operation.

At block 1610, the example measurement circuitry 1510 obtains sensor data from the example pressure sensor(s) 665, 670. In some examples, the sensor data includes a singular point of pressure measurement as shown in FIGS. 9A and 9B, a two-point measurement system as shown in FIGS. 10A and 10B, or three-point measurement system as shown in FIGS. 11A and 11B. In some examples, a reference pressure is taken at a compressor outlet. For example, reference pressure is measured using a pressure sensor at the compressor outlet.

At block 1615, the conversion curve generation circuitry 1515 receives sensor-based input data and determines a correlation between the normalized pressure efficiency ($P\eta$) and the blade clearance. The correlation between the normalized pressure efficiency and the blade clearance is used to generate a conversion curve by the conversion curve generation circuitry 1515. The conversion curve generation is performed at block 1620. For example, testing may be performed in order to collect data to create initial correlations. In some examples, the conversion curve generation circuitry 1515 can generate conversion curves for a range of test flights, for a new engine, or for an engine at various flight cycles. The collection of data for conversion curve generation enables the conversion curves to be validated and the observation and/or testing of engines with gradual blade loss to investigate the effects of blade length changes on pressure efficiency measurements. In some examples, the testing can be performed at varying power levels (low power, high power, etc.), as well as a range of altitudes. An example range of altitudes is 5,000 ft for low altitude up to 35,000 ft for high altitude. Thorough testing and conversion curve development permits the usage of the clearance determination circuitry 1405 during actual in-flight monitoring of clearances and contributes to a more accurate adjustment of the clearances by the ACC 1400.

At block 1625, the example conversion curve generation circuitry 1515 determines a correlation between the normalized pressure efficiency and the blade clearance. This correlation is used by the conversion curve generation circuitry 1515 to generate a conversion curve. The conversion curve is generated for a given power level and/or altitude, based on pressure data and obtained data for a range of test flights performed to observe blade tip loss.

Once the conversion curves have been generated for various power levels and/or altitudes, the measurement circuitry 1510 measures the real-time pressure measurements and feeds that data to the clearance calculation circuitry 1525. At block 1625, the clearance calculation circuitry 1525 uses the conversion curve generated to determine the real-time clearance. At block 1630, the blade tip loss is determined based on the off-set of the curve and the interpolation between the curves. For example, a conversion curve is generated from simulations for a new engine. During real-time, in-flight data collection, pressure measurements are taken and used to calculate pressure efficiency. Expected pressure measurements are generated from initial test conditions. Deviation from the expected pressure measurements indicates blade tip loss, or off-set from the curve.

Once the blade tip loss data is calculated based on the off-set of the conversion curve at block 1630, the blade tip loss data is input to the active clearance controller 1400 for storage and later usage at block 1635. At block 1640, the actuator control circuitry 1520 uses the real-time clearance and associated blade tip loss to send an electrical signal to the actuator 550, 650, 1235, 1335 and multilayer stack 555, 655, 1240, 1340 to actuate the rods of FIGS. 5, 6, 12, and 13 and adjust clearance of the stator nozzle 535, 635, 1230, 1330 and inter-stage seal 540, 640.

Figure 17:
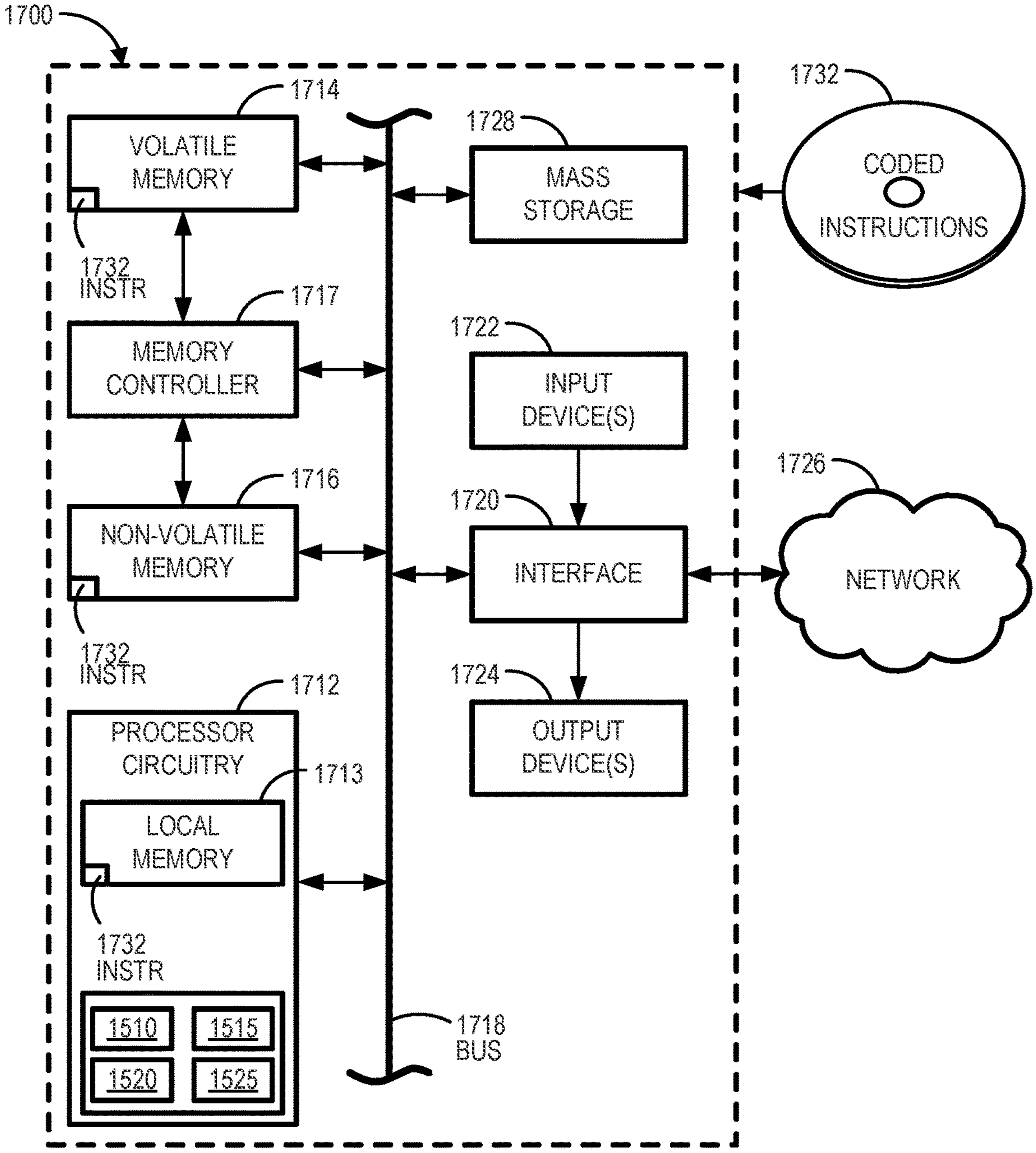
FIG. 17 is a block diagram of an example processing platform structured to execute the instructions of FIG. 16 to implement the example clearance determination instructions of FIG. 15.

FIG. 17 is a block diagram of an example programmable circuitry platform 1700 structured to execute and/or instantiate the example machine-readable instructions and/or the example operations of FIG. 16 to implement the clearance determination circuitry 1405 of FIG. 14. The programmable circuitry platform 1700 can be, for example, a server, a personal computer, a workstation, a self-learning machine (e.g., a neural network), or any other type of computing and/or electronic device.

The programmable circuitry platform 1700 of the illustrated example includes programmable circuitry 1712. The programmable circuitry 1712 of the illustrated example is hardware. For example, the programmable circuitry 1712 can be implemented by one or more integrated circuits, logic circuits, FPGAs, microprocessors, CPUs, GPUS, DSPs, and/or microcontrollers from any desired family or manufacturer. The programmable circuitry 1712 may be implemented by one or more semiconductor based (e.g., silicon based) devices. In this example, the programmable circuitry 1712 implements the clearance determination circuitry 1405.

The programmable circuitry 1712 of the illustrated example includes a local memory 1713 (e.g., a cache, registers, etc.). The programmable circuitry 1712 of the illustrated example is in communication with main memory 1716, which includes a volatile memory 1714 and a non-volatile memory 1716, by a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717. In some examples, the memory controller 1717 may be implemented by one or more integrated circuits, logic circuits, microcontrollers from any desired family or manufacturer, or any other type of circuitry to manage the flow of data going to and from the main memory 1714, 1716.

The programmable circuitry platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1722 are connected to the interface circuitry 1720. The input device(s) 1722 permit(s) a user (e.g., a human user, a machine user, etc.) to enter data and/or commands into the programmable circuitry 1712. The input device(s) 1722 can be implemented by, for example, a pressure sensor, a temperature sensor, etc.

One or more output devices 1724 are also connected to the interface circuitry 1720 of the illustrated example. The output device(s) 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), etc. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1700 of the illustrated example also includes one or more mass storage discs or devices 1728 to store firmware, software, and/or data. Examples of such mass storage discs or devices 1728 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1732, which may be implemented by the machine readable instructions of FIGS. 16, may be stored in the mass storage device 1728, in the volatile memory 1714, in the non-volatile memory 1716, and/or on at least one non-transitory computer readable storage medium such as a CD or DVD which may be removable.

As shown in FIG. 17, the measurement circuitry 1510, conversion curve generation circuitry 1515, actuator control circuitry 1520, and clearance calculation circuitry may be instantiated in the programmable circuitry 1712. The data storage may be instituted by a local memory 1713, volatile memory 1714, non-volatile memory 1716, or mass storage device 1728.

Figure 18:
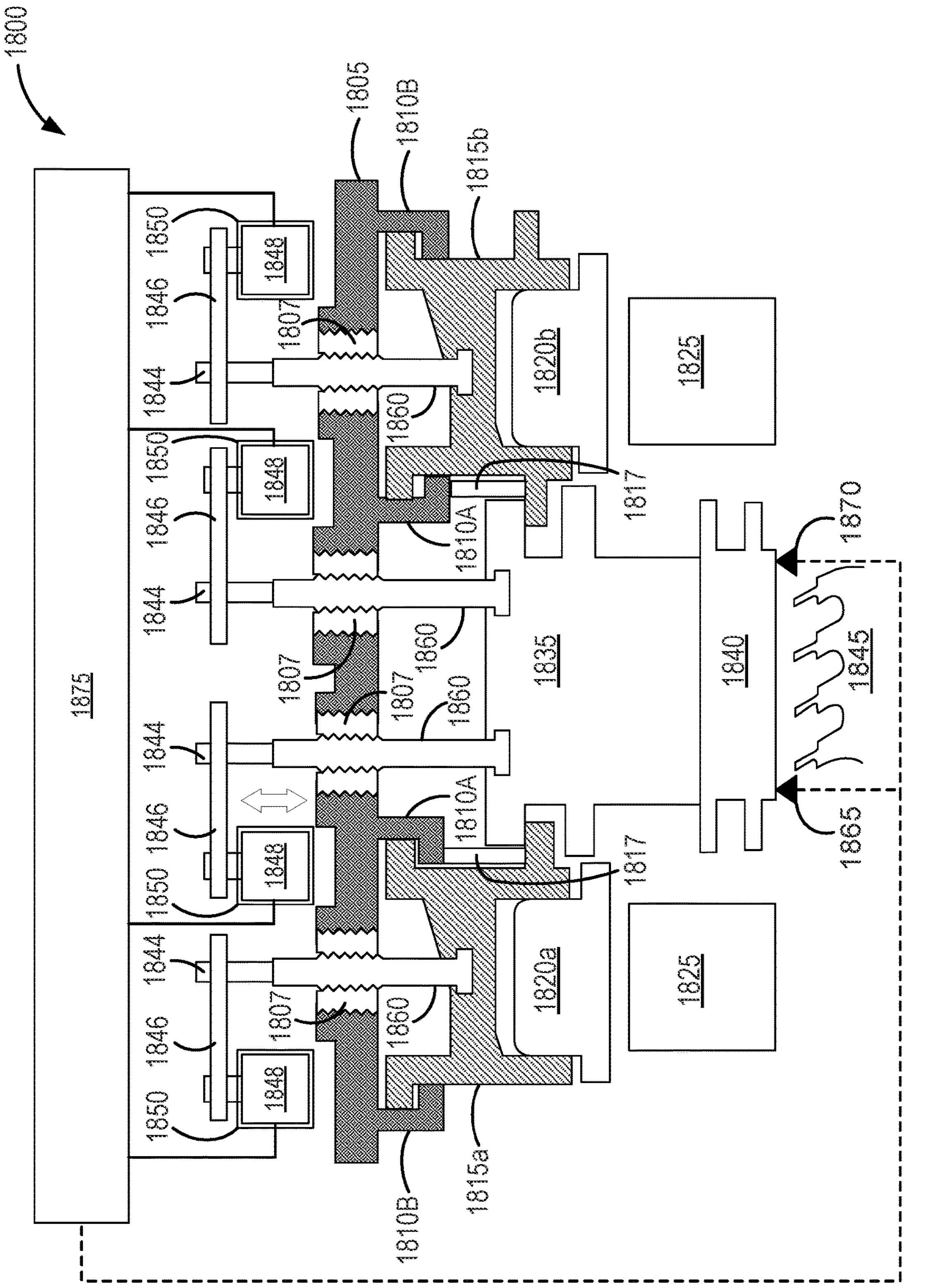
FIG. 18 is a schematic cross-sectional view of a fourth example ACC system for a high pressure turbine engine in accordance with teachings disclosed herein.

FIG. 18 shows that in addition to using piezoelectric materials or SMA materials with a multilayer stack, a mechanical arm could be used in conjunction with an actuator 1850. FIG. 18 illustrates an example ACC system 1800, which can be used as a mechanical arm actuator. The ACC system 1800 includes an active clearance controller 1875, an engine case 1805, multiple adjustment sleeves 1807, guide hooks 1810A, 1810B, a forward hanger 1815*a*, a forward shroud 1820*a*, an aft hanger 1815*b*, an aft shroud 1820*b*, a stator nozzle 1835, a mid-stage seal 1817, an inter-stage seal 1840, a rotor 1845, blades 1825, a forward pressure sensor 1865, an aft pressure sensor 1870, an annular sync ring 1848, a sync arm 1846, and an externally threaded rod 1860 having an outboard end 1844.

For example, an active clearance controller 1875 and actuator 1850 may be connected to an annular sync ring 1848 having a sync arm 1846. The example sync arm 1846 is connected to a first end of an externally threaded rod 1860 with an outboard end 1844. The externally threaded rod 1860 is threaded through an adjustment sleeve 1807 with internal and external threading located inside a threaded internal bore in an example engine case 1805. A second end of the externally threaded rod 1860 is connected to an example stator nozzle 1835. Angular rotation of the sync ring 1848 causes a pivoting movement of the sync arm 1846. The components are coupled to enable rotation of the externally threaded rod with the pivoting movement of the sync arm 1846, causing the externally threaded rod to move radially inward or outward, and adjust the coupled stator nozzle 1835. In turn, the movement of the rod 1860 and stator nozzle 1835 affects the clearance of an inter-stage seal 1840 to an example rotor 1845. An example active clearance controller 1875 is connected to a forward pressure sensor 1865 and an aft pressure sensor 1870. Using the methods disclosed herein, the active clearance controller 1875 leverages conversion curves to determine the clearance between the inter-stage seal 1840 and the rotor 1845. The active clearance controller 1875 accounts for expansion of the engine case 1805 due to heat, the displacement of the forward hanger 1815 and shroud 1820, the aft hanger 1815 and shroud 1820, as well as the determined clearance of the stator nozzle 1835 and inter-stage seal 1840 from the rotor 1845. An electrical signal is sent to the actuator 1850 which actuates the annular sync ring 1848. The annular sync ring 1848 rotates, causing pivoting of the sync arm 1846, which is connected to a first end of the externally threaded rod 1860. The externally threaded rod 1860 rotates, so the internally and externally threaded sleeve 1807 within the engine case 1805, allows the rod to adjust radially inward or outward to adjust the displacement of the stator nozzle 1835 and the inter-stage seal 1840. By adjusting the displacement of the inter-stage seal 1840, the active clearance controller 1875 has finite, real-time control over the clearance. In an example real-world muscle range, a range greater than 15 mils for a mid-size engine is used, whereas a range greater than 30 mils is used for a large size engine.

From the foregoing, it will be appreciated that example methods, apparatus and articles of manufacture have been disclosed that improve clearance control of inter stage and mid stage seals in a gas turbine engine. The disclosed examples propose improved ACC designs using a combination of piezoelectric actuators, pressure measurements, and an active clearance controller to achieve tighter clearance at any operating conditions with rapid mechanical ACC modulation. The disclosed examples use piezoelectric material to generate high mechanical power and provide rapid response clearance control in two directions (inward and outward) with no time delay. The disclosed examples use multilayer stacks of the piezoelectric material to manage the range of displacement, which affects the range of the ACC system muscle capability. The disclosed examples propose real-time clearance assessment methods and rapid response to improve efficiency and operability of engine conditions, to control inter-stage seal clearance, and to prevent nozzle rocking.

Example methods, apparatus, systems, and articles of manufacture to provide rapid active clearance control of inter-stage and mid-stage seals are disclosed herein. Further examples and combinations thereof include the following:

An apparatus to control clearance for a turbine engine, the apparatus comprising a case surrounding at least part of the turbine engine, the at least part of the turbine engine including a nozzle, the nozzle to contain airflow, the nozzle including a reference pressure sensor at a first location on a tip of the nozzle and a static pressure sensor at a second location on the tip of the nozzle, a first actuator to control a clearance between a rotor and the nozzle, the first actuator including a multilayer stack of material, wherein the first actuator is positioned at a third location outside of the case, a first rod coupled to the first actuator and the nozzle through an opening in the case at the third location, the rod to move the nozzle based on contraction or expansion of the multilayer stack of material, and a controller to calculate and set the clearance between the rotor and the nozzle by supplying an electrical current to the multilayer stack in the first actuator.

The apparatus of any preceding clause, wherein the multilayer stack of material is a first multilayer stack of material, wherein the opening is a first opening, and further including a second actuator to control the clearance between a blade and the nozzle, the second actuator including a second multilayer stack of material, wherein the second actuator is positioned at a fourth location outside of the case, and a second rod coupled to the second actuator and the nozzle through a second opening in the case at the fourth location, the second rod to move the nozzle based on the second multilayer stack of material.

The apparatus of any preceding clause, wherein the controller uses a closed loop system, the closed loop system to set a target clearance, the controller to manipulate the actuator to achieve the target clearance based on a clearance calculation, the clearance calculation including at least an engine speed, a turbine pressure, a turbine temperature, a compressor temperature, and a compressor pressure.

The apparatus of any preceding clause, wherein the reference and static pressure measurements are used to develop a normalized pressure measurement, the normalized pressure measure used to generate a conversion curve correlating the normalized pressure measurement with a clearance measurement, the conversion curve used to compare to real-time pressure measurements to adjust a blade tip clearance.

The apparatus of any preceding clause, wherein the controller uses an open loop system, the open loop system to set a target clearance based on the conversion curve and the normalized pressure measurement, the open loop system to manipulate the actuator to achieve the target clearance.

The apparatus of any preceding clause, wherein the multilayer stack of material includes at least one of piezoelectric material or shape memory alloy.

The apparatus of any preceding clause, wherein the reference pressure sensor is placed on at least one of a compressor exit location, an aft location on the nozzle, a middle location on the nozzle, or a forward location on the nozzle.

The apparatus of any preceding clause, wherein the static pressure sensor is placed on at least one of an aft location, a middle location, or a forward location.

The apparatus of any preceding clause, wherein the conversion curve is generated during testing at a plurality of altitudes.

The apparatus of any preceding clause, wherein the conversion curve is generated during testing at a plurality of power levels, the plurality of power levels including at least one of a low power or a high power.

An apparatus to control clearance in a turbine engine, the apparatus comprising a controller to determine a first target clearance between a rotor and a nozzle as well as a second target clearance between a blade and a shroud, the controller in communication with at least one pressure sensor, the control system to supply electrical power to a plurality of actuators, a first actuator to actuate a first rod to achieve the first target clearance based on the controller determination, the first actuator located outside of an engine case and coupled to a first end of the first rod, the first rod positioned through a first seal in the engine case, a second end of the first rod coupled to the nozzle, and a second actuator to actuate a second rod to achieve the second target clearance based on the controller determination, the second actuator located outside of the engine case and coupled to a first end of the second rod, the second rod positioned through a second seal in the engine case, a second end of the second rod coupled to a hanger from which the shroud hangs.

The apparatus of any preceding clause, wherein the controller uses a closed loop system, the closed loop system to determine the first and second target clearances based on a calculation including an engine speed, a turbine pressure, a turbine temperature, a compressor temperature, and a compressor pressure.

The apparatus of any preceding clause, wherein the controller uses an open loop system, the open loop system to set the first and second target clearances based on a conversion curve and a normalized pressure measurement.

The apparatus of any preceding clause, wherein the normalized pressure measurement is developed from reference and static pressure measurements, the normalized pressure measurement used to generate the conversion curve correlating the normalized pressure measurement with a clearance measurement, the conversion curve used to compare to real-time pressure measurements to achieve the first and second target clearances.

The apparatus of any preceding clause, wherein the conversion curve is generated during testing at a plurality of altitudes.

The apparatus of any preceding clause, wherein the conversion curve is generated during testing at a plurality of power levels, the plurality of power levels including at least one of a low power or a high power.

The apparatus of any preceding clause, wherein the conversion curve is generated during testing for a multitude of flight cycles.

The apparatus of any preceding clause, wherein the actuator includes a multilayer stack of material including at least one of piezoelectric material or shape memory alloy.

The apparatus of any preceding clause, wherein the at least one pressure sensor measures pressure at one of a compressor exit location, a forward location on the nozzle, an aft location on the nozzle, or a mid-point location on the nozzle.

An apparatus to control clearance for a turbine engine, the apparatus comprising a case surrounding at least part of the turbine engine, the at least part of the turbine engine including a nozzle, the nozzle to contain airflow, the nozzle including a reference pressure sensor at a first location on a tip of the nozzle and a static pressure sensor at a second location on the tip of the nozzle, a mechanical arm to control a clearance between a rotor and the nozzle, wherein the mechanical arm is positioned at a third location outside of the case, a rod coupled to an actuator and the nozzle through an opening in the case at the third location, the rod to move the nozzle based on contraction or expansion of a multilayer stack of material, and a controller to calculate and set the clearance between the rotor and the nozzle by supplying an electrical current to the multilayer stack in the actuator.

The apparatus of any preceding clause, wherein the controller uses a closed loop system, the closed loop system to determine the first and second target clearances based on a calculation including an engine speed, a turbine pressure, a turbine temperature, a compressor temperature, and a compressor pressure.

The apparatus of any preceding clause, wherein the controller uses an open loop system, the open loop system to set the first and second target clearances based on a conversion curve and a normalized pressure measurement.

The apparatus of any preceding clause, wherein the normalized pressure measurement is developed from reference and static pressure measurements, the normalized pressure measurement used to generate the conversion curve correlating the normalized pressure measurement with a clearance measurement, the conversion curve used to compare to real-time pressure measurements to achieve the first and second target clearances.

The apparatus of any preceding clause, wherein the conversion curve is generated during testing at a plurality of altitudes.

The apparatus of any preceding clause, wherein the conversion curve is generated during testing at a plurality of power levels, the plurality of power levels including at least one of a low power or a high power.

The apparatus of any preceding clause, wherein the conversion curve is generated during testing for a multitude of flight cycles.

The apparatus of any preceding clause, wherein the actuator includes a multilayer stack of material including at least one of piezoelectric material or shape memory alloy.

The apparatus of any preceding clause, wherein the at least one pressure sensor measures pressure at one of a compressor exit location, a forward location on the nozzle, an aft location on the nozzle, or a mid-point location on the nozzle.

A system to control clearance in a turbine engine, the system comprising at least one actuator to house a multilayer stack of material that moves a rod in a radial direction, the rod coupled to a nozzle, at least one sensor placed inside of an engine case, and a controller to use the at least one sensor to monitor a parameter, convert the monitored parameter into an actual clearance between a tip of the nozzle and a rotor, determine the difference between the actual clearance and a predetermined target clearance, supply electrical power to the multilayer stack to actuate the rod to achieve the target clearance.

The system of any preceding clause, wherein the sensor is a pressure sensor placed on the tip of the nozzle within the engine case.

The system of any preceding clause, wherein the sensor is a pressure sensor placed on a shroud within the engine case.

The system of any preceding clause, wherein the predetermined target clearance is obtained from test data, the test data collected for a variety of flight cycles, altitudes, and engine power levels.

The system of any preceding clause, wherein the actuator is located outside of the engine case.

The system of any preceding clause, wherein the multilayer stack includes at least one of a piezoelectric material or a smart metal alloy.

The system of any preceding clause, wherein the normalized pressure measurement includes a difference between a reference pressure and a static pressure, divided by the difference between the reference pressure and a total pressure.

The system of any preceding clause, wherein the normalized pressure measurement includes a difference between a reference pressure and a forward pressure, divided by the difference between the reference pressure and an aft pressure.

The system of any preceding clause, wherein the normalized pressure measurement includes a difference between a static pressure and a reference pressure, divided by the difference between a total pressure and a reference pressure.

The system of any preceding clause, wherein the normalized pressure measurement includes a difference between a forward point pressure and a midpoint pressure, divided by the difference between the forward pressure and an aft pressure.

The system of any preceding clause, wherein the controller is an active clearance controller comprising clearance determination circuitry, the clearance determination circuitry connected to an engine sensor, a pressure sensor, and an actuator.

The system of any preceding clause, wherein the clearance determination circuitry further includes measurement circuitry, conversion curve generation circuitry, clearance calculation circuitry, actuator control circuitry, and data storage.

The apparatus of any preceding clause, wherein the normalized pressure measurement includes a difference between a reference pressure and a static pressure, divided by the difference between the reference pressure and a total pressure.

The apparatus of any preceding clause, wherein the normalized pressure measurement includes a difference between a reference pressure and a forward pressure, divided by the difference between the reference pressure and an aft pressure.

The apparatus of any preceding clause, wherein the normalized pressure measurement includes a difference between a static pressure and a reference pressure, divided by the difference between a total pressure and a reference pressure.

The apparatus of any preceding clause, wherein the normalized pressure measurement includes a difference between a forward point pressure and a midpoint pressure, divided by the difference between the forward pressure and an aft pressure.

The apparatus of any preceding clause, wherein the controller is an active clearance controller comprising clearance determination circuitry, the clearance determination circuitry connected to an engine sensor, a pressure sensor, and an actuator.

The apparatus of any preceding clause, wherein the clearance determination circuitry further includes measurement circuitry, conversion curve generation circuitry, clearance calculation circuitry, actuator control circuitry, and data storage.

Although certain example methods, apparatus and articles of manufacture have been disclosed herein, the scope of coverage of this patent is not limited thereto. For example, the disclosed example methods, apparatus and articles of manufacture are implemented in conjunction with a gas turbine engine, however, the disclosed examples can be implemented in conjunction with a compressor. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to control clearance for a turbine engine, the apparatus comprising:

- a case surrounding at least part of the turbine engine and defining an opening therethrough;
- a nozzle of the turbine engine, the nozzle including a reference pressure sensor at a first location on a tip of the nozzle and a static pressure sensor at a second location on the tip of the nozzle;
- an actuator including a multilayer stack of material, wherein the actuator is positioned at a third location outside of the case;
- a rod coupled to the actuator at the third location and coupled to the nozzle through the opening in the case, the rod to move the nozzle based on contraction or expansion of the multilayer stack of material; and
- a controller to calculate and set a clearance between a rotor and the nozzle by supplying an electrical current to the multilayer stack of material in the actuator to cause the multilayer stack of material to at least one of expand or contract.

2. The apparatus of claim 1, wherein the multilayer stack of material is a first multilayer stack of material, wherein the opening is a first opening, wherein the actuator is a first actuator, wherein the rod is a first rod, and further including:

- a second actuator to control a clearance between a blade and the nozzle, the second actuator including a second multilayer stack of material, wherein the second actuator is positioned at a fourth location outside of the case; and
- a second rod coupled to the second actuator and the nozzle through a second opening in the case at the fourth location, the second rod to move the nozzle based on the second multilayer stack of material.

3. The apparatus of claim 1, wherein the controller uses a closed loop system, the closed loop system to set a target clearance, the controller to manipulate the actuator to achieve the target clearance based on a clearance calculation, the clearance calculation including at least an engine speed, a turbine pressure, a turbine temperature, a compressor temperature, and a compressor pressure.

4. The apparatus of claim 1, wherein a reference pressure measurement obtained from the reference pressure sensor and a static pressure measurement obtained from the static pressure sensor are used to develop a normalized pressure measurement, the normalized pressure measurement used to generate a conversion curve correlating the normalized pressure measurement with a clearance measurement, the conversion curve used to compare to real-time pressure measurements to adjust a blade tip clearance.

5. The apparatus of claim 4, wherein the controller uses an open loop system, the open loop system to set a target clearance based on the conversion curve and the normalized pressure measurement, the open loop system to manipulate the actuator to achieve the target clearance.

6. The apparatus of claim 1, wherein the multilayer stack of material includes at least one of a piezoelectric material or a shape memory alloy.

7. The apparatus of claim 1, wherein the reference pressure sensor is disposed on at least one of a compressor exit location, an aft location on the nozzle, a middle location on the nozzle, or a forward location on the nozzle.

8. The apparatus of claim 1, wherein the static pressure sensor is disposed on at least one of an aft location on the nozzle, a middle location on the nozzle, or a forward location on the nozzle.

9. The apparatus of claim 4, wherein the conversion curve is generated during testing at a plurality of altitudes.

10. The apparatus of claim 4, wherein the conversion curve is generated during testing at a plurality of power levels, the plurality of power levels including at least one of a low power or a high power.

11. An apparatus to control clearance in a turbine engine, the apparatus comprising:

- a controller to determine, using an open loop system, a first target clearance between a rotor and a nozzle and a second target clearance between a blade and a shroud, the controller in communication with at least one pressure sensor, the controller to supply electrical power to a plurality of actuators, the open loop system to set the first and second target clearances based on a conversion curve and a normalized presure measurement;
- a first actuator of the plurality of actuators to actuate a first rod to achieve the first target clearance based on the controller determination, the first actuator located outside of an engine case and coupled to a first end of the first rod, the first rod positioned through a first seal in the engine case, a second end of the first rod coupled to the nozzle; and
- a second actuator of the plurality of actuators to actuate a second rod to achieve the second target clearance based on the controller determination, the second actuator located outside of the engine case and coupled to a first end of the second rod, the second rod positioned through a second seal in the engine case, a second end of the second rod coupled to a hanger from which the shroud hangs.

12. The apparatus of claim 11, wherein the normalized pressure measurement is developed from reference and static pressure measurements, the normalized pressure measurement used to generate the conversion curve correlating the normalized pressure measurement with a clearance measurement, the conversion curve used to compare to real-time pressure measurements to achieve the first and second target clearances.

13. The apparatus of claim 12, wherein the conversion curve is generated during testing at a plurality of altitudes.

14. The apparatus of claim 12, wherein the conversion curve is generated during testing at a plurality of power levels, the plurality of power levels including at least one of a low power or a high power.

15. The apparatus of claim 12, wherein the conversion curve is generated during testing for a plurality of flight cycles.

16. The apparatus of claim 11, wherein the first actuator includes a multilayer stack of material including at least one of a piezoelectric material or a shape memory alloy.

17. The apparatus of claim 11, wherein the at least one pressure sensor measures pressure at one of a compressor exit location, a forward location on the nozzle, an aft location on the nozzle, or a mid-point location on the nozzle.

18. An apparatus to control clearance for a turbine engine, the apparatus comprising:

a case surrounding at least part of the turbine engine;

a nozzle to contain airflow, the nozzle including a reference pressure sensor at a first location on a tip of the nozzle and a static pressure sensor at a second location on the tip of the nozzle;

a mechanical arm to control a clearance between a rotor and the nozzle, wherein the mechanical arm is positioned at a third location outside of the case;

a rod coupled to the mechanical arm and coupled to the nozzle through an opening in the case at the third location, the rod to move the nozzle based on pivoting movement of the mechanical arm; and a controller to calculate and set the clearance between the rotor and the nozzle by supplying an electrical signal to an actuator to cause pivoting movement of the mechanical arm.

* * * * *